(12) United States Patent
Kutchko et al.

(10) Patent No.: US 12,434,434 B2
(45) Date of Patent: Oct. 7, 2025

(54) METHODS OF MAKING CHEMICALLY RESISTANT SEALING COMPONENTS

(71) Applicant: PPG Industries Ohio, Inc., Cleveland, OH (US)

(72) Inventors: Cynthia Kutchko, Pittsburgh, PA (US); Eric S. Epstein, Pittsburgh, PA (US); Bryan W. Wilkinson, Pittsburgh, PA (US); Zhisong Huang, San Dimas, CA (US); Sean J. Manion, Los Angeles, CA (US); Kerianne M. Dobosz, Pittsburgh, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 933 days.

(21) Appl. No.: 17/430,151

(22) PCT Filed: Feb. 10, 2020

(86) PCT No.: PCT/US2020/017417
§ 371 (c)(1),
(2) Date: Aug. 11, 2021

(87) PCT Pub. No.: WO2020/167622
PCT Pub. Date: Aug. 20, 2020

(65) Prior Publication Data
US 2022/0097299 A1    Mar. 31, 2022

Related U.S. Application Data

(60) Provisional application No. 62/803,769, filed on Feb. 11, 2019.

(51) Int. Cl.
*B29C 64/194*    (2017.01)
*B29C 64/118*    (2017.01)
(Continued)

(52) U.S. Cl.
CPC .......... *B29C 64/194* (2017.08); *B29C 64/118* (2017.08); *B29C 64/209* (2017.08);
(Continued)

(58) Field of Classification Search
None
See application file for complete search history.

(56) References Cited

U.S. PATENT DOCUMENTS 3,517,082 A   6/1970   Cockerham
3,563,957 A   2/1971   Beebe
(Continued)

FOREIGN PATENT DOCUMENTS

CA   2378348 A1   2/2001
CA   2950215 A1   12/2015
(Continued)

OTHER PUBLICATIONS

Universal Selector by SpecialChem, Desmophen® 550 U Technical Data Sheet—Supplied by Covestro, Mar. 4, 2021, 2 pages, http://coatings.specialchem.com.
(Continued)

*Primary Examiner* — Carlos R Ortiz Rodriguez

(57) ABSTRACT

Sealing components having complex shapes and smooth surfaces are may be fabricated using coreactive three-dimensional printing. More specifically the invention relates to chemically resistant sealing components and methods of making said sealing components using three-dimensional printing, and that may be used in vehicle applications.

14 Claims, 7 Drawing Sheets

(51) Int. Cl.

| | | |
|---|---|---|
| *B29C 64/209* | (2017.01) | |
| *B33Y 10/00* | (2015.01) | |
| *B33Y 40/00* | (2020.01) | |
| *B33Y 70/00* | (2020.01) | |
| *B33Y 80/00* | (2015.01) | |
| *F16J 15/44* | (2006.01) | |

(52) U.S. Cl.
CPC ............... *B33Y 10/00* (2014.12); *B33Y 40/00* (2014.12); *B33Y 70/00* (2014.12); *B33Y 80/00* (2014.12); *F16J 15/44* (2013.01)

(56) References Cited

U.S. PATENT DOCUMENTS

| | | |
|---|---|---|
| 3,799,854 A | 3/1974 | Jerabek |
| 3,919,351 A | 11/1975 | Chang |
| 4,046,729 A | 9/1977 | Scriven et al. |
| 4,147,769 A | 4/1979 | Dea et al. |
| 4,220,679 A | 9/1980 | Backhouse |
| 4,403,003 A | 9/1983 | Backhouse |
| 4,546,045 A | 10/1985 | Elias |
| 4,623,711 A | 11/1986 | Morris et al. |
| 4,681,811 A | 7/1987 | Simpson et al. |
| 4,732,790 A | 3/1988 | Blackburn et al. |
| 4,798,746 A | 1/1989 | Claar et al. |
| 5,071,904 A | 12/1991 | Martin et al. |
| 5,114,989 A | 5/1992 | Elwell et al. |
| 5,262,259 A | 11/1993 | Chou et al. |
| 5,468,802 A | 11/1995 | Wilt et al. |
| 5,777,061 A | 7/1998 | Yonek et al. |
| 6,172,179 B1 | 1/2001 | Zook et al. |
| 6,259,962 B1 | 7/2001 | Gothait |
| 6,454,972 B1 | 9/2002 | Morissette et al. |
| 6,509,418 B1 | 1/2003 | Zook et al. |
| 6,558,753 B1 | 5/2003 | Ylitalo et al. |
| 6,875,800 B2 | 4/2005 | Vanier et al. |
| 6,894,086 B2 | 5/2005 | Munro et al. |
| 7,009,032 B2 | 3/2006 | Bojkova et al. |
| 7,247,596 B2 | 7/2007 | Jialanella et al. |
| 7,390,859 B2 | 6/2008 | Sawant et al. |
| 7,455,804 B2 | 11/2008 | Patel et al. |
| 7,531,117 B2 | 5/2009 | Ederer et al. |
| 7,578,958 B2 | 8/2009 | Patel et al. |
| 7,767,130 B2 | 8/2010 | Elsner et al. |
| 7,875,666 B2 | 1/2011 | Gilmore et al. |
| 7,879,955 B2 | 2/2011 | Rao et al. |
| 7,955,537 B2 | 6/2011 | Ederer et al. |
| 7,957,825 B2 | 6/2011 | Marsh et al. |
| 8,138,273 B2 | 3/2012 | Rao et al. |
| 8,466,220 B2 | 6/2013 | Rao et al. |
| 8,535,463 B2 | 9/2013 | Allen et al. |
| 8,541,513 B2 | 9/2013 | Hobbs et al. |
| 8,729,216 B2 | 5/2014 | Hobbs et al. |
| 8,816,023 B2 | 8/2014 | Anderson et al. |
| 8,876,513 B2 | 11/2014 | Lim et al. |
| 8,883,392 B2 | 11/2014 | Napadensky et al. |
| 8,952,124 B2 | 2/2015 | Rao et al. |
| 8,993,691 B2 | 3/2015 | Anderson et al. |
| 9,079,833 B2 | 7/2015 | Klobes et al. |
| 9,122,819 B2 | 9/2015 | McDowell et al. |
| 9,216,547 B2 | 12/2015 | Elsey |
| 9,370,132 B2 | 6/2016 | Coppola |
| 9,382,640 B2 | 7/2016 | Yamagata |
| 9,422,451 B2 | 8/2016 | Rao et al. |
| 9,452,445 B2 | 9/2016 | Frankenberger |
| 9,540,540 B2 | 1/2017 | Rao et al. |
| 9,650,537 B2 | 5/2017 | Kunc et al. |
| 9,663,619 B2 | 5/2017 | Echigoya et al. |
| 9,708,440 B2 | 7/2017 | Das et al. |
| 9,744,720 B2 | 8/2017 | Napadensk |
| 9,796,858 B2 | 10/2017 | Powell et al. |
| 9,862,059 B2 | 1/2018 | Liebl et al. |
| 9,873,761 B1 | 1/2018 | Das et al. |
| 9,883,711 B2 | 2/2018 | McDowell et al. |
| 9,944,826 B2 | 4/2018 | Czaplewski et al. |
| 9,982,164 B2 | 5/2018 | Rolland et al. |
| 9,992,917 B2 | 6/2018 | Yanke et al. |
| 10,016,941 B1 | 7/2018 | Beard et al. |
| 10,059,595 B1 | 8/2018 | Farbstein |
| 10,071,350 B2 | 9/2018 | Lewis et al. |
| 10,074,449 B2 | 9/2018 | White et al. |
| 10,139,808 B2 | 11/2018 | Engelbart et al. |
| 10,232,549 B2 | 3/2019 | Hayes et al. |
| 10,243,295 B2 | 3/2019 | Matlack et al. |
| 10,253,195 B2 | 4/2019 | Fenn et al. |
| 10,259,956 B2 | 4/2019 | Chopra et al. |
| 10,350,823 B2 | 7/2019 | Rolland et al. |
| 10,400,057 B2 | 9/2019 | Kwisnek et al. |
| 10,449,714 B2 | 10/2019 | Achten et al. |
| 10,464,031 B2 | 11/2019 | Lewis et al. |
| 10,538,031 B2 | 1/2020 | Chen et al. |
| 10,625,470 B2 | 4/2020 | Sun et al. |
| 10,639,842 B2 | 5/2020 | Leibig et al. |
| 10,639,844 B2 | 5/2020 | Rolland et al. |
| 10,683,381 B2 | 6/2020 | Abell et al. |
| 10,688,770 B2 | 6/2020 | Boydston et al. |
| 10,772,246 B2 | 9/2020 | Speaker et al. |
| 10,792,860 B2 | 10/2020 | Wantanabe et al. |
| 10,932,399 B1 | 2/2021 | Nowak et al. |
| 10,947,969 B2 | 3/2021 | Overend et al. |
| 10,948,082 B2 | 3/2021 | Delong et al. |
| 10,968,340 B1 | 4/2021 | Mapkar et al. |
| 11,192,632 B2 | 12/2021 | Dovey |
| 11,209,084 B2 | 12/2021 | Dovey |
| 2001/0043990 A1 | 11/2001 | Chong et al. |
| 2002/0122928 A1 | 9/2002 | Botrie et al. |
| 2002/0182339 A1 | 12/2002 | Taylor et al. |
| 2003/0004599 A1 | 1/2003 | Herbak |
| 2004/0189311 A1 | 9/2004 | Glezer et al. |
| 2004/0220327 A1 | 11/2004 | Cosman et al. |
| 2005/0171237 A1 | 8/2005 | Patel et al. |
| 2005/0287354 A1 | 12/2005 | Jennings et al. |
| 2006/0046068 A1 | 3/2006 | Barancyk et al. |
| 2006/0108450 A1 | 5/2006 | Klinkenberg et al. |
| 2007/0141267 A1 | 6/2007 | Sonnenschein et al. |
| 2009/0065357 A1 | 3/2009 | Glezer et al. |
| 2009/0126225 A1 | 5/2009 | Jarvis |
| 2010/0041839 A1 | 2/2010 | Anderson et al. |
| 2010/0076143 A1 | 3/2010 | Yakulis et al. |
| 2010/0113252 A1 | 5/2010 | Bordia et al. |
| 2010/0234485 A1 | 9/2010 | Kohli et al. |
| 2012/0117822 A1 | 5/2012 | Jarvis |
| 2012/0159785 A1 | 6/2012 | Pyles et al. |
| 2012/0244337 A1 | 9/2012 | Gavin |
| 2012/0313056 A1 | 12/2012 | Baran et al. |
| 2013/0073073 A1 | 3/2013 | Pettis |
| 2013/0095253 A1 | 4/2013 | Lindsay et al. |
| 2013/0196124 A1 | 8/2013 | Flores et al. |
| 2013/0237661 A1 | 9/2013 | Brust et al. |
| 2013/0253084 A1 | 9/2013 | Duggal et al. |
| 2013/0271526 A1 | 10/2013 | Ciampini et al. |
| 2013/0284359 A1 | 10/2013 | Virnelson |
| 2013/0302575 A1 | 11/2013 | Moegele et al. |
| 2013/0344340 A1 | 12/2013 | Senkfor et al. |
| 2014/0012406 A1 | 1/2014 | Cioffi et al. |
| 2014/0017460 A1 | 1/2014 | Xu et al. |
| 2014/0220354 A1 | 8/2014 | Gao et al. |
| 2014/0323647 A1 | 10/2014 | Voit et al. |
| 2014/0331520 A1* | 11/2014 | Yakulis, Jr. ........ C08G 18/6685 36/98 |
| 2015/0014881 A1 | 1/2015 | Elsey |
| 2015/0307738 A1 | 10/2015 | Schmucker et al. |
| 2015/0321434 A1 | 11/2015 | Sterman et al. |
| 2016/0009029 A1 | 1/2016 | Cohen et al. |
| 2016/0039145 A1 | 2/2016 | Steiner |
| 2016/0083619 A1 | 3/2016 | Anderson et al. |
| 2016/0090507 A1 | 3/2016 | Keledjian et al. |
| 2016/0107391 A1 | 4/2016 | Parish et al. |
| 2016/0152775 A1 | 6/2016 | Tobis et al. |
| 2016/0167299 A1 | 6/2016 | Jallouli et al. |
| 2016/0244980 A1 | 8/2016 | Urban et al. |
| 2016/0250688 A1 | 9/2016 | Coppola |
| 2016/0257067 A1 | 9/2016 | Boydston et al. |
| 2016/0271872 A1 | 9/2016 | Sand |

(56) References Cited

U.S. PATENT DOCUMENTS

| | | |
|---|---|---|
| 2016/0271878 A1 | 9/2016 | Nuechterlein et al. |
| 2016/0297104 A1 | 10/2016 | Guillemette et al. |
| 2016/0332382 A1 | 11/2016 | Coward et al. |
| 2016/0333152 A1 | 11/2016 | Cook et al. |
| 2016/0374428 A1 | 12/2016 | Kormann et al. |
| 2017/0057160 A1 | 3/2017 | Duty et al. |
| 2017/0066196 A1 | 3/2017 | Beard et al. |
| 2017/0114208 A1 | 4/2017 | Rao et al. |
| 2017/0145202 A1 | 5/2017 | Sparks et al. |
| 2017/0246802 A1 | 8/2017 | Pyzik et al. |
| 2017/0266691 A1 | 9/2017 | Travis |
| 2017/0266877 A1 | 9/2017 | Tyler |
| 2017/0291357 A1 | 10/2017 | Fong et al. |
| 2017/0321083 A1 | 11/2017 | Fenn et al. |
| 2017/0341296 A1 | 11/2017 | Fenn et al. |
| 2017/0369620 A1 | 12/2017 | Abell et al. |
| 2017/0369737 A1 | 12/2017 | Cui et al. |
| 2018/0029291 A1 | 2/2018 | Matzner et al. |
| 2018/0056582 A1 | 3/2018 | Matusik et al. |
| 2018/0059541 A1 | 3/2018 | Campbell et al. |
| 2018/0086002 A1 | 3/2018 | Sun et al. |
| 2018/0100075 A1 | 4/2018 | Chopra et al. |
| 2018/0133952 A1 | 5/2018 | Gu et al. |
| 2018/0133953 A1 | 5/2018 | Achten et al. |
| 2018/0133954 A1 | 5/2018 | Watanabe et al. |
| 2018/0162981 A1 | 6/2018 | Achten et al. |
| 2018/0207863 A1 | 7/2018 | Porter et al. |
| 2018/0215854 A1 | 8/2018 | Paranthaman et al. |
| 2018/0223795 A1 | 8/2018 | Tobin et al. |
| 2018/0244854 A1 | 8/2018 | Drazba et al. |
| 2018/0264719 A1 | 9/2018 | Rolland et al. |
| 2018/0362784 A1 | 12/2018 | Gorin et al. |
| 2019/0001553 A1 | 1/2019 | Robeson et al. |
| 2019/0010370 A1 | 1/2019 | Lin et al. |
| 2019/0030795 A1 | 1/2019 | Jiang et al. |
| 2019/0037969 A1 | 2/2019 | Busbee et al. |
| 2019/0040204 A1 | 2/2019 | Beyer et al. |
| 2019/0118497 A1 | 4/2019 | Kierbel et al. |
| 2019/0152133 A1 | 5/2019 | Busbee |
| 2019/0176998 A1 | 6/2019 | Renwick et al. |
| 2019/0217536 A1 | 7/2019 | Honorato et al. |
| 2019/0248065 A1 | 8/2019 | Gorin et al. |
| 2019/0276689 A1 | 9/2019 | Dhoble et al. |
| 2019/0358983 A1 | 11/2019 | Busbee et al. |
| 2020/0131385 A1 | 4/2020 | Bartow et al. |
| 2020/0164572 A1 | 5/2020 | Bartow et al. |
| 2020/0180220 A1 | 6/2020 | Nelson et al. |
| 2020/0217332 A1 | 7/2020 | Mohr et al. |
| 2020/0276797 A1 | 9/2020 | Zdrojek et al. |
| 2020/0312782 A1 | 10/2020 | Eid et al. |
| 2020/0361136 A1* | 11/2020 | Fenn ............... B29C 64/336 |
| 2021/0008793 A1 | 1/2021 | Pokrass et al. |

FOREIGN PATENT DOCUMENTS

| | | |
|---|---|---|
| CN | 102896923 A | 1/2013 |
| CN | 104031383 A | 9/2014 |
| CN | 105313332 A | 2/2016 |
| CN | 107471629 A | 12/2017 |
| CN | 109041563 A | 12/2018 |
| CN | 109247005 A | 1/2019 |
| CN | 110628192 A | 12/2019 |
| CN | 111087792 A | 5/2020 |
| CN | 111391305 A | 7/2020 |
| CN | 111774561 A | 10/2020 |
| DE | 19937770 A1 | 2/2001 |
| DE | 102011003619 A1 | 8/2012 |
| DE | 102015220699 A1 | 3/2017 |
| EP | 0437374 B1 | 12/1996 |
| EP | 2416950 A1 | 2/2012 |
| EP | 2658702 A1 | 11/2013 |
| EP | 2719484 A1 | 4/2014 |
| EP | 2851208 A1 | 3/2015 |
| EP | 3059171 A1 | 8/2016 |
| EP | 3232071 A1 | 10/2017 |
| EP | 3550142 A1 | 10/2019 |
| EP | 3626442 A1 | 3/2020 |
| EP | 3626443 A1 | 3/2020 |
| FR | 3039553 A1 | 2/2017 |
| JP | H03-210364 A | 9/1991 |
| JP | H04-366617 A | 12/1992 |
| JP | 2001-518408 A | 10/2001 |
| JP | 2002-166460 A | 6/2002 |
| JP | 2003-506228 | 2/2003 |
| JP | 2011-105906 A | 6/2011 |
| JP | 5085800 B1 | 11/2012 |
| JP | 2013-136724 A | 7/2013 |
| JP | 2014-521797 A | 8/2014 |
| JP | 2015-512816 A | 4/2015 |
| JP | H06-026637 B2 | 11/2015 |
| JP | 2016-530430 A | 9/2016 |
| JP | 62-53354 B2 | 12/2017 |
| JP | 2018-002896 A | 1/2018 |
| JP | 2018-502197 A | 1/2018 |
| JP | 2019-504919 A | 2/2019 |
| KR | 101891560 A | 3/2018 |
| NO | 2010/024904 A1 | 3/2010 |
| RU | 2247087 C2 | 2/2005 |
| RU | 2332265 C2 | 8/2008 |
| RU | 2532190 C2 | 10/2014 |
| RU | 2014113527 A | 10/2015 |
| RU | 2673840 C1 | 11/2018 |
| RU | 2677143 C1 | 1/2019 |
| TW | 201509698 A | 3/2015 |
| TW | 201821248 A | 6/2018 |
| WO | 2001/010630 A1 | 2/2001 |
| WO | 2004/076852 A1 | 9/2004 |
| WO | 2006/073695 A1 | 7/2006 |
| WO | 2007/044735 A2 | 4/2007 |
| WO | 2013/091003 A1 | 6/2013 |
| WO | 2016/061060 A1 | 4/2016 |
| WO | 2016/085914 A1 | 6/2016 |
| WO | 2016/085976 A1 | 6/2016 |
| WO | 2016/085992 A1 | 6/2016 |
| WO | 2016/106352 A1 | 6/2016 |
| WO | 2016/149032 A1 | 9/2016 |
| WO | 2016/164562 A1 | 10/2016 |
| WO | 2016/182805 A1 | 11/2016 |
| WO | 2016/201103 A1 | 12/2016 |
| WO | 2017/087055 A1 | 5/2017 |
| WO | 2017/095658 A1 | 6/2017 |
| WO | 2017/112682 A1 | 6/2017 |
| WO | 2017/144461 A1 | 8/2017 |
| WO | 2018/005686 A1 | 1/2018 |
| WO | 2018/007579 A1 | 1/2018 |
| WO | 2017/130685 A1 | 2/2018 |
| WO | 2018/026829 A1 | 2/2018 |
| WO | 2018/031532 A1 | 2/2018 |
| WO | 2018/049038 A1 | 3/2018 |
| WO | 2018072034 A1 | 4/2018 |
| WO | 2018/085650 A1 | 5/2018 |
| WO | 2017/092764 A1 | 6/2018 |
| WO | 2018/106822 A1 | 6/2018 |
| WO | 2018/113875 A1 | 6/2018 |
| WO | 2018/157148 A1 | 8/2018 |
| WO | 2019/089235 A1 | 5/2019 |
| WO | 2019/173511 A1 | 9/2019 |
| WO | 2019/191509 A1 | 10/2019 |
| WO | 2019/204770 A1 | 10/2019 |
| WO | 2019/217848 A1 | 11/2019 |
| WO | 2019/224699 A1 | 11/2019 |
| WO | 2020/107365 A1 | 6/2020 |
| WO | 2020/147567 A1 | 7/2020 |
| WO | 2020/251661 A1 | 12/2020 |

OTHER PUBLICATIONS

Covestro Desmodur® VL Product Data Sheet, Sep. 1, 2015, 3 pages.
International Search Report and Written Opinion for Application No. PCT/US2015/062297, mailed on Mar. 4, 2016, 10 pages.
International Search Report and Written Opinion for Application No. PCT/US2015/062445, mailed on Mar. 1, 2016, 10 pages.

(56) References Cited

OTHER PUBLICATIONS

International Search Report and Written Opinion for Application No. PCT/US2015/062412, mailed on Mar. 2, 2016, 9 pages.
International Search Report and Written Opinion for Application No. PCT/IB2018/056254, mailed on Nov. 19, 2018, 10 pages.
International Search Report and Written Opinion for Application No. PCT/US2019/026672, mailed on Jul. 25, 2019, 12 pages.
International Search Report and Written Opinion for Application No. PCT/US2020/017428, mailed on Jul. 29, 2020, 18 pages.
International Search Report and Written Opinion for Application No. PCT/US2020/017455, mailed on May 25, 2020, 11 pages.
International Search Report and Written Opinion for Application No. PCT/US2020/017464, mailed on May 25, 2020, 9 pages.
International Search Report and Written Opinion for Application No. PCT/US2020/039557, mailed on Oct. 8, 2020, 13 pages.
International Search Report and Written Opinion for Application No. PCT/US2020/017417, mailed on Jun. 12, 2020, 10 pages.
International Search Report and Written Opinion for Application No. PCT/US2020/017441, mailed on Jun. 22, 2020, 8 pages.
International Preliminary Report on Patentability for Application No. PCT/US2015/062297, mailed on May 30, 2017, 7 pages.
International Preliminary Report on Patentability for Application No. PCT/US2015/062445, mailed on May 30, 2017, 8 pages.
International Preliminary Report on Patentability for Application No. PCT/US2015/062412, mailed on May 30, 2017, 7 pages.
First Report for Australian Application No. 2015 353730, mailed on Mar. 15, 2018, 6 pages.
First Report for Australian Application No. 2015 353634, mailed on Mar. 5, 2018, 6 pages.
First Report for Australian Application No. 2015 353618, mailed on Sep. 21, 2017, 6 pages.
Canadian Office Action for Application No. 2,968,549, mailed on May 7, 2018, 4 pages.
Canadian Office Action for Application No. 2,968,670, mailed on Jun. 11, 2018, 3 pages.
Canadian Office Action for Application No. 2,968,538, mailed on Jun. 6, 2018, 4 pages.
Russia Office Action for Application No. 2017121858, mailed on May 16, 2018, 2 pages.
Russia Office Action for Application No. 2017122126, mailed on May 16, 2018, 4 pages.
Asif, M. et al., "A new photopolymer extrusion 5-axis 3D printer," Additive Manufacturing, 2018, vol. 23, p. 355-361.
Asif, M. et al., "A New 3D Printing Technique Using Extrusion of Photopolymer," Conference Paper, Jan. 2017, 11 pages.
"The Jeffamine® Polyetheramines," Huntsman, 2007, 6 pages.
Broekaert, "Polyurea Spray Coatings: The Technology and Latest Developments," Paint & Coatings Industry, Mar. 2002, 15 pages.
Formlabs White Paper: 3D Printing with Desktop Stereolithography, An Introduction for Professional Users, Jun. 2015, retrieved from https://archive-media.formlabs.com/upload/Intro-sla-whitepaper-04.pdf, 12 pages.
Hurlbert. "Visual perception: Learning to see through noise", Current Biology, Mar. 2000, vol. 10, No. 6, p. R231-R233.
Kitano, H. et al., "Unexpected Visible-Light-Induced Free Radical Photopolymerization at Low Light Intensity and High Viscosity Using a Titanocene Photoinitiator," Journal of Applied Polymer Science, 2013, p. 611-618.
Krober, P. et al., "Reactive inkjet printing of polyurethanes," Journal of Material Chemistry, 2009, vol. 19, p. 5234-5238.
Quadion LLC, Minnesota Rubber and Plastic, Thermoset Plastics vs Thermoplastics, https://www.mnrubber.com/Design_Guide/5-2.html, Oct. 25, 2014, accessed Nov. 7, 2019.
Rios, Orlando, "Evaluation of Advanced Polymers for Additive Manufacturing," CRADA Final Report NFE-14-05252, Oak Ridge National Laboratory, Sep. 8, 2017, 29 pages.
Smith, P. et al., "Reactive inkjet printing," Journal of Materials Chemistry, 2012, vol. 22, p. 10965-10970.
Viscosity of Water, retrieved from https://www.engineersedge.com/physics/water_density_viscosity_specific_weight_13146.htm, accessed Apr. 20, 2020, first published Jun. 25, 2014.
Zhu et al., "Water-based coatings for 3D printed parts", Journal of Coatings Technology and Research, Jul. 2015, vol. 12, No. 5, p. 889-897.

* cited by examiner

METHODS OF MAKING CHEMICALLY RESISTANT SEALING COMPONENTS

This application claims the benefit under 35 U.S.C. § 119(e) of U.S. Provisional Application No. 62/803,769 filed on Feb. 11, 2019, which is incorporated by reference in its entirety.

FIELD

The disclosure relates to chemically resistant sealing components and methods of making chemically resistant sealing components using three-dimensional printing. The chemically resistant sealing components can be useful in vehicle applications.

BACKGROUND

Chemically resistant sealing components are used to provide an interface between opposing surfaces of parts. The opposing surfaces of the parts can have complex shapes and can be non-planar. The sealing components can be used to seal the interface from liquids and solvents, can be used to accommodate non-planarity between opposing surfaces, and/or can conform to changes in the relative position of the opposing surfaces during use. Sealing components are typically prefabricated. Sealing components used to seal opposing surfaces having complex shapes can be difficult to expensive to fabricate.

SUMMARY

According to the present invention, methods of making a chemically resistant sealing component, comprise: depositing successive layers of a coreactive composition in a predetermined shape using three-dimensional printing; and curing the deposited coreactive composition to provide a chemically resistant sealing component, wherein a fracture energy of the fully cured sealing component is substantially the same as a fracture energy of an individual layer, wherein the fracture energy is determined according to ASTM D7313.

BRIEF DESCRIPTION OF THE DRAWINGS

The drawings described herein are for illustration purposes only. The drawings are not intended to limit the scope of the present disclosure.

FIG. 3A is a photograph of the top surface of the sealing component; FIG. 3B is a heat map visualizing the surface topography of the sealing component; FIG. 3C shows the normalized topographical surface profile of the sealing component surface along the surface indicated by the solid line in FIG. 3A; and FIG. 3D shows the unnormalized topographical surface profile of the sealing component surface along the surface indicated by the solid line in FIG. 3A. The 2 Ra surface waviness was 10.1 µm.

FIG. 4A is a photograph of the top surface of the sealing component; FIG. 4B is a heat map visualizing the surface topography of the sealing component; FIG. 4C shows the normalized topographical surface profile of the sealing component surface along the surface indicated by the solid line in FIG. 4A; and FIG. 4D shows the unnormalized topographical surface profile of the sealing component surface along the surface indicated by the solid line in FIG. 4A. The 2 Ra surface waviness was 2.7 µm.

DETAILED DESCRIPTION

Definitions

Figure 1A:
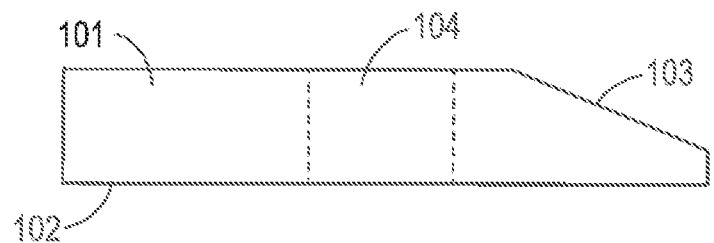
FIG. 1A shows a cross-sectional view of an example of a sealing component provided by the present disclosure.

For purposes of the following detailed description, it is to be understood that embodiments provided by the present disclosure may assume various alternative variations and step sequences, except where expressly specified to the contrary. Moreover, other than in any operating examples, or where otherwise indicated, all numbers expressing, for example, quantities of ingredients used in the specification and claims are to be understood as being modified in all instances by the term "about." Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

A "backbone" of a prepolymer refers to the segment between the reactive terminal groups. A prepolymer backbone typically includes repeating subunits. For example, the backbone of a polythiol HS—$[R]_n$—SH is —$[R]_n$—.

"Composition" is intended to encompass a product comprising the specified components in the specified amounts, as well as any product which results, directly or indirectly, from the combination of the specified ingredients in the specified amounts.

A "coreactive composition" refers to a composition comprising two or more compounds capable of reacting at a temperature less than 50° C. The reaction between the two or more compounds may be initiated by exposing the coreactive composition to actinic radiation.

A "component" refers to a composition that when combined with another component forms a coreactive composition. A first component can comprise a compound capable of reacting with a compound in the second component. A first component can comprise coreactive compounds that are not reactive until combined with a second component comprising a polymerization initiator such as a photoinitiator. In addition to the reactive compound, a component can comprise one or more additives. A component by itself is not reactive until it is combined with another component to form a coreactive composition. A component can be combined with one or more additional components in a three-dimensional printing apparatus and mixed to provide a coreactive composition, and the coreactive composition can be deposited in successive layers to build an object such as a sealing component.

"Cure time" refers to the duration from when co-reactive components are first combined and mixed to form a coreactive composition until a layer prepared from the coreactive composition exhibits a hardness of Shore 30A at conditions of 25° C. and 50% RH. For an actinic radiation-curable composition the cure time refers to the duration from when composition is first exposed to actinic radiation to the time when a layer prepared from the actinic radiation-curable composition exhibits a hardness of Shore 30A at conditions of 25° C. and 50% RH.

"Fracture energy" is determined according to ASTM D7313.

"Cured coreactive composition" refers to a coreactive composition having a hardness greater than 90% of the maximum hardness.

"Partially cured coreactive composition refers to a coreactive composition that has a hardness less than 90% of the maximum hardness.

"Hardness" is determined as appropriate for a particular material. For example, for soft elastomers hardness can be determined according to the Shore A scale and for hard elastomers and other thermosets hardness can be determined according to the Shore D scale.

A monomer refers to a compound having a molecular weight, for example, less than 1,000 Da, less than 800 Da less than 600 Da, less than 500 Da, less than 400 Da, or less than 300 Da. A monomer can have a molecular weight, for example, from 100 Da to 1,000 Da, from 100 Da to 800 Da, from 100 Da to 600 Da, from 150 Da, to 550 Da, or from 200 Da to 500 Da. A monomer can have a molecular weight greater than 100 Da, greater than 200 Da, greater than 300 Da, greater than 400 Da, greater than 500 Da, greater than 600 Da, or greater than 800 Da. The molecular weight of a prepolymer is based on the chemical structure. A monomer may or may not contain repeat units. A monomer can have a functionality of 2, 3, 4, 5, 6, or a combination of any of the foregoing. A monomer can have an average reactive functionality, for example, from 2 to 6, from 2 to 5, from 2 to 4, from 2 to 3, from 2.1 to 2.8, or from 2.2 to 2.6.

"Predetermined shape" refers to an intended shape of a part such as a chemically resistant sealing component provided by the present disclosure. A predetermined shape can be designed using CAD/CAM methods and the three-dimensional design can be used to control a three-dimensional printing system for fabricating the sealing component.

"Prepolymer" refers to homopolymers and copolymers. For thiol-terminated prepolymers, molecular weights are number average molecular weights "Mn" as determined by end group analysis using iodine titration. A prepolymer that are not thiol-terminated, the number average molecular weights are determined by gel permeation chromatography using polystyrene standards. A prepolymer comprises reactive groups capable of reacting with another compound such as a curing agent, which can be another prepolymer, or crosslinker to form a cured polymer. A prepolymer includes multiple repeating subunits bonded to each other than can be the same or different. The multiple repeating subunits make up the backbone of the prepolymer.

A prepolymer can have a number average molecular weight, for example, less than 20,000 Da, less than 15,000 Da, less than 10,000 Da, less than 8,000 Da, less than 6,000 Da, less than 4,000 Da, or less than 2,000 Da. A prepolymer can have a number average molecular weight, for example, greater than 2,000 Da, greater than 4,000 Da, greater than 6,000 Da, greater than 8,000 Da, greater than 10,000 Da, or greater than 15,000 Da. A prepolymer can have a number average molecular weight, for example, from 1,000 Da to 20,000 Da, from 2,000 Da to 10,000 Da, from 3,000 Da to 9,000 Da, from 4,000 Da to 8,000 Da, or from 5,000 Da to 7,000 Da.

"Sealant" refers to a material that has the ability when cured capable of resisting at least one of atmospheric condition, such as moisture and/or temperature and at least partially block the transmission of materials, such as water, solvent, fuel, hydraulic fluid and other liquids and gasses. A sealant can exhibit chemical resistance such as resistance to fuels and hydraulic fluids. A chemically resistant material can exhibit, for example, a % swell less than 25%, less than 20%, less than 15%, or less than 10% following immersion in the chemical for 7 days at 70° C. as determined according to EN ISO 10563. A sealant can exhibit resistance to Jet Reference Fluid (JRF) Type I, to Skydrol® LD-4 hydraulic fluid, and/or to a 3% NaCl aqueous solution following as determined according to AMS 3265B.

Shore A hardness is measured using a Type A durometer in accordance with ASTM D2240.

Specific gravity is determined according to ISO 787-11.

"Surface waviness" is determined using a profilometer or using confocal microscopy. Surface waviness as reported herein was determined using a wide area Keyence VR-3200 3D optical measurement system. Surface waviness is the extension of the Ra (arithmetical mean height of a line) to a surface. Surface waviness expresses the difference in height of each point compared to the arithmetical mean of the surface.

A surface profile such as the height and average height of a feature such as parallel print lines and topographical features can be measured using a profilometer or using a Keyence VR-3200 macroscope.

Tensile strength and elongation are measured according to AMS 3279.

Viscosity is measured using an Anton Paar rheometer with a 25 mm plate geometry at 2 rpm and at 25° C.

Reference is now made to certain compounds, compositions, apparatus, and methods of the present invention. The disclosed compounds, compositions, apparatus, and methods are not intended to be limiting of the claims. To the contrary, the claims are intended to cover all alternatives, modifications, and equivalents.

Methods of making a chemically resistant sealing component provided by the present disclosure comprise depositing successive layers of a coreactive composition in a predetermined shape using three-dimensional printing; and curing the deposited coreactive composition to provide a chemically resistant sealing component, wherein a fracture energy of the fully cured sealing component is substantially the same as a fracture energy of an individual layer, wherein the fracture energy is determined according to ASTM D7313.

Chemical resistance refers to the ability of a material such as a sealing component to minimize the diffusion of relevant gases and liquids through the material and such that exposure of the material to relevant gases and liquids during the design life of the material under use conditions will not decrease the physical properties of the material below a certain threshold. The relevant gases and solvents, use conditions, product life, and threshold physical properties can depend on the specific use application. Examples of relevant solvents include high temperature gases, high temperature water, salt water, salt spray, cleaning solvents, greases, fuels, hydraulic fluids, oils, and lubricants.

Chemical resistance can be determined by measuring the % swell following immersion of a material in a particular solvent for 7 days at a temperature of 70C. A chemically resistant material can exhibit a % swell less than 25%, less than 20%, less than 15%, or less than 10%, following immersion in a chemical for 7 days at 70° C., where % swell is determined according to EN ISO 10563.

Other chemical resistance tests can be application specific. For example, for certain aerospace sealant applications, following exposure to Jet Reference Fluid (JRF Type 1) according to ISO 1817 for 168 hours at 60° C., a cured composition provided can exhibit a tensile strength greater than 1.4 MPa determined according to ISO 37, a tensile elongation greater than 150% determined according to ISO 37, and a hardness greater than Shore 30A determined according to ISO 868, where the tests are performed at a temperature of 23° C., and a humidity of 55% RH. Following exposure to de-icing fluid according to ISO 11075 Type 1 for 168 hours at 60° C., a cured composition can exhibit a tensile strength greater than 1 MPa determined according to ISO 37, and a tensile elongation greater than 150% determined according to ISO 37, where the tests are performed at a temperature of 23° C., and a humidity of 55% RH. Following exposure to phosphate ester hydraulic fluid (Skydrol® LD-4) for 1,000 hours at 70° C., a cured composition can exhibit a tensile strength greater than 1 MPa determined according to ISO 37, a tensile elongation greater than 150% determined according to ISO 37, and a hardness greater than Shore 30A determined according to ISO 868, where the tests are performed at a temperature of 23° C., and a humidity of 55% RH.

Sealing components can be used to seal the interface from liquids and solvents, can be used to accommodate non-planarity between opposing surfaces, and/or can conform to changes in the relative position of the opposing surfaces during use. Examples of sealing components include gaskets, shims, washers, grommets, O-rings, spacers, packing, cushions, mating material, flanges, and bushings.

A chemically resistant sealing component is a material or part that is used to minimize diffusion of gases and solvents into an interface or joint between two opposing surface and thereby seal the interface.

Figure 1B:
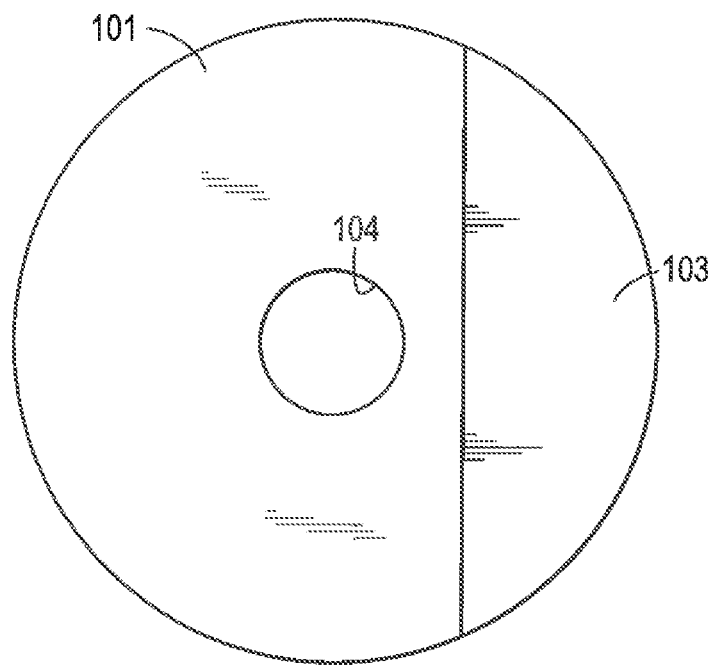
FIG. 1B shows a top view of an example of a sealing component provided by the present disclosure.

A sealing component can have any suitable shape including any suitable three-dimensional shape as appropriate to seal opposing surfaces of parts to be sealed. A sealing component can have, for example, planar opposing surfaces; a sealing component can have one planar surface and the opposing surface can be non-planar; or both surfaces of a sealing component can have non-planar surfaces. A sealing component can have a top surface and an opposing surface. A portion of a sealing component can have opposing surfaces that are planar with respect to each other or non-planar with respect to each other. For example, a top and/or bottom surface of a sealing component can be tapered, and the portion of the sealing component can be wedge-shaped. As an example, FIG. 1A shows a cross-sectional profile of a sealing component including a top surface 101, a bottom surface 102, a wedge-shaped portion 103, and a center hole. During three-dimensional printing the nozzle is directed toward what becomes the top surface 101 of the sealing component. FIG. 1B shows a top view of the top surface 101 of the sealing component including the wedge-shaped portion 103 and a center hole 104.

A sealing component can have a substantially constant cross-sectional thickness throughout the sealing component. A sealing component can have a variable cross-sectional thickness in different portions of the sealing component. For example, some cross-sectional portions of a sealing component can be thicker or thinner than other cross-sectional portions of the sealing component.

A sealing component fabricated using three-dimensional printing methods provided by the present disclosure can have any shape suitable for a particular application. In general, the surfaces of a sealing component can be shaped to conform to the opposing surfaces of the parts to be sealed with the sealing component.

To facilitate mating between the opposing part surfaces and to minimize the creation of voids during assembly, the portions toward the center of the sealing component can be thicker than the portions toward the periphery of the sealing component. With this design, the surfaces toward the center of the sealing component first contact the opposing part surfaces and facilitate the ability of air to be displaced toward the periphery of the sealing component as the sealing component and parts are assembled.

Three-dimensional printing using coreactive compositions can be used to fabricate sealing components having complex shapes.

To provide a robust environmental seal between the sealing component surfaces and the surfaces of the parts to be sealed it is desirable that the sealing component surfaces be smooth. For example, it can be desirable that a sealing component surface have a 2 Ra waviness less than 200 µm, less than 100 µm, 50 µm, less than 40 µm, less than 30 µm, less than 20 µm, less than 10 µm, or less than 5µm. A sealing component can have surface can have, for example, a 2 Ra waviness greater than 5µm, greater than 10 µm, greater than 20 µm, greater than 30 µm, greater than 40 µm, greater than 50 µm, or greater than 100 µm. A sealing component can have surface can have, for example, a 2 Ra waviness from 10 µm to 200 µm, or from 20 µm to 100 µm. As another metric, the average 2 Ra surface waviness of a sealing component can be less than 10% the average waviness wavelength, such as less than 5% or less than 1% the average waviness wavelength. The average waviness wavelength refers to the distance between adjacent three-dimensional print lines. Methods of fabricating sealing components having smooth surfaces suitable for providing robust environmental seals using three-dimensional printing are disclosed.

Coreactive three-dimensional printing methods provided by the present disclosure can be used to fabricate chemically resistant sealing component in which adjoining layers have a high mechanical strength. Adjoining layers of a coreactive composition can chemically bond and/or physical bond to create a mechanically strong interlayer interface. The strength of the interlayer interface can be determined by measuring the fracture energy according to ASTM D7313. Chemically resistant sealing components made using methods provided by the present disclosure can have a fracture energy that is substantially the same as the fracture energy of an individual layer. For example, the fracture energy of the sealing component and the fracture energy of an individual cured layer of the coreactive composition can be, for example, within less than 10%, less than 5%, less than 2% or less 1%.

Another metric that can be used to assess the integrity of the interlayer bonding of the three-dimensionally printed sealant component is to compare the physical properties such as the tensile strength and % elongation in the direction of the print lines and in the direction orthogonal to the print lines. An example is described in Example 2. Chemically resistant sealing components made by methods provided by the present disclosure can have isotropic physical properties within the printing plane, for example, within 10%, within 5%, within 2%, or within 1% independent of the in-plane direction of the measurement. For example, the maximum tensile strength and % elongation to break can be within +/−10%, within +/−5%, within +/−2%, or within +/−1% of a mean maximum tensile strength and % elongation to break, respectively, independent of the in-plane direction of the measurement.

Three-dimensional printing methods provided by the present disclosure comprise extruding a coreactive composition through a nozzle of a three-dimensional printing apparatus and depositing successive layers of the coreactive composition to fabricate a sealing component.

A coreactive composition can be a one-part coreactive composition or a two-part coreactive composition.

For a one-part coreactive composition, the coreactive composition can be pumped into a three-dimensional printing apparatus and before, during, and/or after deposition the coreactive composition can be exposed to an energy source to initiate a chemical reaction between the coreactive compounds. An example of a one-part coreactive composition is a radiation-curable composition such as a UV-curable composition. The reaction can be initiated, for example, by application of energy such as thermal energy, acoustic energy, mechanical energy, and/or by actinic radiation. A one-part composition can comprise a latent catalyst that is activated immediately before and/or during application. Examples of latent catalysts include moisture activated catalysts, core/shell encapsulants, photoinitiated catalysts, photolabile catalysts, and other latent catalysts. An example of one-part coatings include coatings that are curable by actinic radiation, such as using UV radiation.

For a two-part coreactive composition, a first component and a second component can be pumped into a three-dimensional printing apparatus and combined and mixed to form a coreactive composition. For example, a first component can comprise a first reactive compound and a second component can comprise a second reactive compound, wherein the first compound is reactive with the second compound. The first and second components can comprise compounds capable of coreacting without exposure to energy. For example, the first reactive component can comprise a compound having a first functional group, and the second reactive component can comprise a compound having a second functional group, where the first and second functional groups can coreact without exposure to external energy. An example is an amine-catalyzed thiol/ene reaction. As another example, a first component can comprise a first reactive compound and a second reactive compound, wherein the first and second compounds are reactive in the presence of a polymerization initiator such as, for example, a catalyst, a cure accelerator, or a free radical polymerization initiator, and the second component can comprise the polymerization initiator. The first and second reactive compounds can react when combined with the polymerization imitator to form the coreactive composition, or the first and second reactive compounds can react with the polymerization is initiated. For example, a UV photopolymerization initiator can be activated by exposing the corrective composition to UV-radiation and thereby initiate a free-radical catalyzed thiol/ene reaction.

A coreactive composition can be prepared by combining and mixing a first component comprising a first coreactive compound and a second component comprising second reactive compound, wherein the first reactive compound is reactive with the second reactive compounds. The first component and/or the second component can comprise a catalyst a cure accelerator, and/or a polymerization initiator.

A coreactive composition can be prepared by combining a mixing a first component comprising a first reactive compound and a second reactive compound, wherein the first reactive compound is reactive with the second reactive compound in the presence of a catalyst, a cure accelerator, and/or polymerization initiator; and the second component comprises the catalyst, the cure accelerator, and/or the polymerization initiator.

A coreactive composition can comprise monomers, prepolymers, and/or additives. A coreactive composition can be based on any suitable curing chemistry. The materials and curing chemistries can be selected based on the desired environmental and physical properties of the sealing component.

A coreactive composition can be substantially free of solvent. For example, a coreactive composition can comprise less than 5 wt % solvent, less than 2 wt %, less than 1 wt %, or less than 0.1 wt % solvent, where wt % is based on the total weight of the coreactive composition.

A coreactive composition can comprise a prepolymer or combination of prepolymers.

A coreactive composition can comprise a first compound comprising one or more first functional group and a second compound comprising one or more second functional group, where the one or more first and the one or more second functional groups are coreactive. Each of the one or more first functional groups can be the same or at least some of the first functional groups can be different than other first functional groups. Each of the one or more second functional groups can be the same or at least some of the second functional groups can be different than other second functional groups.

The particular functional groups and curing chemistries can be selected to provide a desired curing rate and/or to impart a desired property to a cured layer of a chemically resistant sealing component.

Examples of useful curing chemistries include hydroxyl/isocyanate, amine/isocyanate, epoxy/epoxy, and Michael acceptor/Michael donor reactions.

Thus, a first functional group can comprise an isocyanate and a second functional group can comprise a hydroxyl group, an amine group, or a combination thereof.

A first functional group can comprise an epoxy group and a second functional group can comprise an epoxy group.

A first functional group can comprise a Michael acceptor group and a second functional group can comprise a Michael donor group.

A first functional group can be a saturated functional group and the second functional group can be an unsaturated group. Each of the first functional group and the second functional can comprise a saturated functional group. Each of the first functional group and the second functional can comprise an unsaturated functional group. A saturated functional group refers to a functional group having a single bond. Examples of saturated functional groups include thiol, hydroxyl, primary amine, secondary amine, and epoxy groups. An unsaturated functional group refers to a group having a reactive double bond. Examples of unsaturated functional groups include alkenyl groups, Michael acceptor groups, isocyanate groups, acyclic carbonate groups, acetoacetate groups, carboxylic acid groups, vinyl ether groups, (meth)acrylate groups, and malonate groups.

The first functional group can be a carboxylic acid group and the second functional group can be an epoxy group.

The first functional group can be a Michael acceptor group such as a (meth)acrylate group, a maleic group, or a fumaric group, and the second functional group can be a primary amine group or a secondary amine group.

The first functional group can be an isocyanate group and the second functional group can be a primary amine group, a secondary amine group, a hydroxyl group, or a thiol group.

The first functional group can be a cyclic carbonate group, an acetoacetate group, or an epoxy group; and the second functional group can be a primary amine group, or a secondary amine group.

The first functional group can be a thiol group, and the second functional group can be an alkenyl group, a vinyl ether group, a (meth)acrylate group.

The first functional group can be a Michael acceptor group such as (meth)acrylate group, a cyanoacrylate, a vinylether a vinylpyridine, or an α,β-unsaturated carbonyl group and the second functional group can be a malonate group, an acetylacetonate, a nitroalkane, or other active alkenyl group.

The first functional group can be a thiol group, and the second functional group can be an alkenyl group, an epoxy group, an isocyanate group, an alkynyl group, or a Michael acceptor group.

The first functional group can be a Michael donor group, and the second functional group can be a Michael acceptor group.

Both the first functional group and the second functional group can be thiol groups.

Both the first functional group and the second functional group can be alkenyl groups.

Both the first functional group and the second functional group can be Michael acceptor groups such as (meth) acrylate groups.

Functional groups can be selected to coreact at temperatures, for example, less than 50° C., less than 40° C., less than 30° C., less than 20° C., or less than 10° C. Functional groups can be selected to coreact at temperatures, for example, greater than 5° C., greater than 10° C., greater than 20° C., greater than 30° C., or greater than 40° C. Functional groups can be selected to coreact, for example, at temperatures from 5° C. to 50° C., from 10° C. to 40° C., from 15° C., to 35° C., or from 20° C. to 30° C. A coreactive composition can comprise coreactive compounds that coreact and cure at room temperature, where room temperature refers to a temperature from 20° C. to 25° C., from 20° C. to 22° C., or about 20° C.

The cure rate for any of these coreactive chemistries can be modified by including an appropriate catalyst or combination of catalysts in a coreactive composition. The cure rate for any of these coreactive chemistries can be modified by increasing or decreasing the temperature of the coreactive composition. For example, although a coreactive composition can cure at temperatures less than 30° C., heating the coreactive composition can accelerate the reaction rate, which can be desirable under certain circumstances such as to accommodate an increased printing speed. Increasing the temperature of the coreactive components and/or the coreactive composition can also serve to adjust the viscosity to facilitate mixing the coreactive components and/or depositing the coreactive composition.

To form a chemically resistant sealing component, it can be desirable that certain layers cure faster than other layers. For example, it can be desirable that an exterior layer cure fast to facilitate the ability of a chemically resistant sealing component to retain an intended shape, and an interior layer to cure slowly to develop adhesion and/or desirable physical properties over time.

Coreactive compositions are thermosetting compositions and when cured form thermosets.

A prepolymer can comprise a backbone having any suitable chemical structure.

A prepolymer backbone can be selected based on considerations of tensile strength, % elongation, thermal resistance, chemical resistance, low temperature flexibility, hardness, and a combination of any of the foregoing. The selection of a prepolymer can also be based on cost considerations.

A coreactive compositions can comprise a prepolymer or combination of prepolymers. Prepolymers can influence, for example, the tensile strength, % elongation, hydrolytic stability, compression, and/or chemical resistance, as well as other properties of the cured sealing component.

Prepolymers can be liquid at 25° C. and can have a glass transition temperature Tg, for example, less than −20° C., less than −30° C., or less than −40° C.

A prepolymer can exhibit a viscosity, for example, within a range from 20 poise to 500 poise (2 Pa-sec to 50 Pa-sec), from 20 poise to 200 poise (2 Pa-sec to 20 Pa-sec) or from 40 poise to 120 poise (4 Pa-sec to 12 Pa-sec), measured using a Brookfield CAP 2000 viscometer, with a No. 6 spindle, at speed of 300 rpm, and a temperature of 25° C.

A prepolymer can have a reactive functionality, for example, less than 12, less than 10, less than 8, less than 6, or less than 4. Each of the first compound and the second compound can comprise a respective reactive functionality, for example, from 2 to 12, from 2 to 8, from 2 to 6, from 2 to 4, or from 2 to 3. Each of the first compound and the second compound can independently have a functionality, for example, of 2, 3, 4, 5, 6, 7, 8, 9, 10, 11, or 12.

A prepolymer can comprise segments having different chemical structure and properties within the prepolymer backbone. The segments can be distributed randomly, in a regular distribution, or in blocks. The segments can be used to impart certain properties to the prepolymer backbone. For example, the segments can comprise flexible linkages such as thioether linkages into the polymer backbone. Segments having pendent groups can be incorporated into the prepolymer backbone.

For example, a prepolymer backbone can comprise a polythioether, a polysulfide, a polyformal, a polyisocyanate, a polyurea, polycarbonate, polyphenylene sulfide, polyethylene oxide, polystyrene, acrylonitrile-butadiene-styrene, polycarbonate, styrene acrylonitrile, poly(methylmethacrylate), polyvinylchloride, polybutadiene, polybutylene terephthalate, poly(p-phenyleneoxide), polysulfone, polyethersulfone, polyethylenimine, polyphenylsulfone, acrylonitrile styrene acrylate, polyethylene, syndiotactic or isotactic polypropylene, polylactic acid, polyamide, ethyl-vinyl acetate homopolymer or copolymer, polyurethane, copolymers of ethylene, copolymers of propylene, impact copolymers of propylene, polyetheretherketone, polyoxymethylene, syndiotactic polystyrene (SPS), polyphenylene sulfide (PPS), liquid crystalline polymer (LCP), homo- and copolymer of butene, homo- and copolymers of hexene; and combinations of any of the foregoing.

Examples of other suitable prepolymer backbones include polyolefins (such as polyethylene, linear low density polyethylene (LLDPE), low density polyethylene (LDPE), high density polyethylene, polypropylene, and olefin copolymers), styrene/butadiene rubbers (SBR), styrene/ethylene/butadiene/styrene copolymers (SEBS), butyl rubbers, ethylene/propylene copolymers (EPR), ethylene/propylene/diene monomer copolymers (EPDM), polystyrene (including high impact polystyrene), poly(vinyl acetates), ethylene/vinyl acetate copolymers (EVA), poly(vinyl alcohols), ethylene/vinyl alcohol copolymers (EVOH), poly(vinyl butyral), poly(methyl methacrylate) and other acrylate polymers and copolymers (including such as methyl methacrylate polymers, methacrylate copolymers, polymers derived from one or more acrylates, methacrylates, ethyl acrylates, ethyl methacrylates, butyl acrylates, butyl methacrylates and the like), olefin and styrene copolymers, acrylonitrile/butadiene/styrene (ABS), styrene/acrylonitrile polymers (SAN), styrene/maleic anhydride copolymers, isobutylene/maleic anhydride copolymers, ethylene/acrylic acid copolymers, poly(acrylonitrile), polycarbonates (PC), polyamides, polyesters, liquid crystalline polymers (LCPs), poly(lactic acid), poly(phenylene oxide) (PPO), PPO-polyamide alloys, polysulfone (PSU), polyetherketone (PEK), polyetheretherketone (PEEK), polyimides, polyoxymethylene (POM) homo- and copolymers, polyetherimides, fluorinated ethylene propylene polymers (FEP), poly(vinyl fluoride), poly(vinylidene fluoride), poly(vinylidene chloride), and poly(vinyl chloride), polyurethanes (thermoplastic and thermosetting), aramides (such as Kevlar® and Nomex®), polytetrafluoroethylene (PTFE), polysiloxanes (including polydimethylenesiloxane, dimethylsiloxane/vinylmethylsiloxane copolymers, vinyldimethylsiloxane terminated poly(dimethylsiloxane)), elastomers, epoxy polymers, polyureas, alkyds, cellulosic polymers (such as ethyl cellulose, ethyl hydroxyethyl cellulose, carboxymethyl cellulose, cellulose acetate, cellulose acetate propionates, and cellulose acetate butyrates), polyethers and glycols such as poly(ethylene oxide)s (also known as poly(ethylene glycol)s, poly(propylene oxide)s (also known as poly(propylene glycol)s, and ethylene oxide/propylene oxide copolymers, acrylic latex polymers, polyester acrylate oligomers and polymers, polyester diol diacrylate polymers, and UV-curable resins.

A coreactive composition can comprise a prepolymer comprising an elastomeric backbone.

"Elastomer," "elastomeric" and similar terms refer to materials with "rubber-like" properties and generally having a low Young's modulus and a high tensile strain. For example, elastomers can have a Young's modulus/tensile strength from about 4 MPa to about 30 MPa. Elastomers can have a tensile strain (elongation at break) from about 100% to about 2,000%. The Young's modulus/tensile strength and tensile strain can be determined according to ASTM D412.4893. Elastomers can exhibit a tear strength, for example, from 50 kN/m to 200 kN/m. Tear strength of an elastomer can be determined according to ASTM D624. The Young's modulus of an elastomer can range from 0.5 MPa to 6 MPa as determined according to ASTM D412.4893.

Examples of suitable prepolymers having an elastomeric backbone include polyethers, polybutadienes, fluoroelastomers, perfluoroelastomers, ethylene/acrylic copolymers, ethylene propylene diene terpolymers, nitriles, polythiolamines, polysiloxanes, chlorosulfonated polyethylene rubbers, isoprenes, neoprenes, polysulfides, polythioethers, silicones, styrene butadienes, and combinations of any of the foregoing. An elastomeric prepolymer can comprise a polysiloxane, such as, for example, a polymethylhydrosiloxane, polydimethylsiloxane, polyhydrodiethylsiloxane, polydiethylsiloxane, or a combination of any of the foregoing. The elastomeric prepolymer can comprise terminal functional groups that have a low reactivity with amine and isocyanate groups such as silanol groups.

Examples of prepolymers that exhibit high solvent resistance include fluoropolymers, ethylene propylene diene terpolymer (EPDM), and other chemically resistant prepolymers disclosed herein, cured polymeric matrices having a high crosslinking density, chemically resistant organic filler such as polyamides, polyphenylene sulfides, and polyethylenes, or a combination of any of the foregoing.

Examples of prepolymers that exhibit low temperature flexibility include silicones, polytetrafluoroethylenes, polythioethers, polysulfides, polyformals, polybutadienes, certain elastomers, and combinations of any of the foregoing.

Examples of prepolymers that exhibit hydrolytic stability include silicones, polytetrafluoroethylenes, polythioethers, polysulfides, polyformals, polybutadienes, certain elastomers, and combinations of any of the foregoing, and compositions having a high crosslinking density.

Examples of prepolymers that exhibit high temperature resistance can comprise, for example, prepolymers such as silicones, polytetrafluoroethylenes, polythioethers, polysulfides, polyformals, polybutadienes, certain elastomer, and combinations of any of the foregoing; and compositions having a high crosslinking density.

Examples of prepolymers that exhibit high tensile include silicones and polybutadiene, compositions having high crosslinking density, inorganic filler, and combinations of any of the foregoing.

A prepolymer can comprise a sulfur-containing prepolymer or a combination of sulfur-containing polymer.

A sulfur-containing prepolymer refers to a prepolymer that has one or more thioether —$S_n$— groups, where n can be, for example, 1 to 6, in the backbone of the prepolymer. Prepolymers that contain only thiol or other sulfur-containing groups either as terminal groups or as pendent groups of the prepolymer are not encompassed by sulfur-containing prepolymers. The prepolymer backbone refers to the portion of the prepolymer having repeating segments. Thus, a prepolymer having the structure of HS—R—R(—$CH_2$—SH)—[—R—($CH_2$)$_2$—S(O)$_2$—($CH_2$)—S(O)$_2$]$_n$—CH=$CH_2$ where each R is a moiety that does not contain a sulfur atom, is not encompassed by a sulfur-containing prepolymer. A prepolymer having the structure HS—R—R(—$CH_2$—SH)—[—R—($CH_2$)$_2$—S(O)$_2$—($CH_2$)$_2$—S(O)$_2$—]CH=$CH_2$ where at least one R is a moiety that contains a sulfur atom, such as a thioether group, is encompassed by a sulfur-containing prepolymer.

Sulfur-containing prepolymers can impart chemical resistance to a cured sealant.

Prepolymer backbones that exhibit chemical resistance can have a high sulfur content. For example, a sulfur-containing prepolymer backbone can have a sulfur content greater than 10 wt %, greater than 12 wt %, greater than 15 wt %, greater than 18 wt %, greater than 20 wt %, or greater than 25 wt %, where wt % is based on the total weight of the prepolymer backbone. A chemically resistant prepolymer backbone can have a sulfur content, for example, from 10 wt % to 25 wt %, from 12 wt % to 23 wt %, from 13 wt % to 20 wt %, or from 14 wt % to 18 wt %, where wt % is based on the total weight of the prepolymer backbone.

A coreactive composition can comprise, for example, from 40 wt % to 80 wt %, from 40 wt % to 75 wt %, from 45 wt % to 70 wt %, or from 50 wt % to 70 wt % of a sulfur-containing prepolymer or combination of sulfur-containing prepolymers, where wt % is based on the total weight of the coreactive composition. A coreactive composition can comprise, for example, greater than 40 wt %, greater than 50 wt %, greater than 60 wt %, greater than 70 wt %, greater than 80 wt %, or greater than 90 wt % of a sulfur-containing prepolymer or combination of sulfur-containing prepolymer, where wt % is based on the total weight of the coreactive composition. A coreactive composition can comprise, for example, less than 90 wt %, less than 80 wt %, less than 70 wt %, less than 60 wt %, less than 50 wt %, or less than 40 wt % of a sulfur-containing prepolymer or combination of sulfur-containing prepolymers, where wt % is based on the total weight of the coreactive composition.

Examples of prepolymers having a sulfur-containing backbone include polythioether prepolymers, polysulfide prepolymers, sulfur-containing polyformal prepolymers, monosulfide prepolymers, and a combination of any of the foregoing.

A prepolymer can comprise a polythioether prepolymer or a combination of polythioether prepolymers.

A polythioether prepolymer can comprise a polythioether prepolymer comprising at least one moiety having the structure of Formula (1), a thiol terminated polythioether prepolymer of Formula (1a), a terminal-modified polythioether of Formula (1b), or a combination of any of the foregoing:

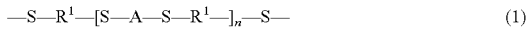  (1)

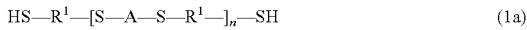  (1a)

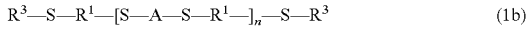  (1b)

wherein,
n can be an integer from 1 to 60;
each $R^1$ can independently be selected from $C_{2-10}$ alkanediyl, $C_{6-8}$ cycloalkanediyl, $C_{6-14}$ alkanecycloalkanediyl, $C_{5-8}$ heterocycloalkanediyl, and $-[(CHR)_p-X-]_q(CHR)_r-$ where,
p can be an integer from 2 to 6;
q can be an integer from 1 to 5;
r can be an integer from 2 to 10;
each R can independently be selected from hydrogen and methyl; and
each X can independently be selected from O, S, and S—S; and
each A can independently be a moiety derived from a polyvinyl ether of Formula (2) or a polyalkenyl polyfunctionalizing agent of Formula (3):

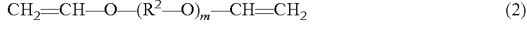  (2)

  (3)

wherein,
m can be an integer from 0 to 50;
each $R^2$ can independently be selected from $C_{1-10}$ alkanediyl, $C_{6-8}$ cycloalkanediyl, $C_{6-14}$ alkanecycloalkanediyl, and $-[(CHR)_p-X-]_q(CHR)_r-$, wherein p, q, r, R, and X are as defined as for $R^1$;
each $R^3$ can independently be moiety comprising a terminal reactive group;
B represents a core of a z-valent, polyalkenyl polyfunctionalizing agent $B(-R^4-CH=CH_2)_z$ wherein,
z can be an integer from 3 to 6; and
each $R^4$ can independently be selected from $C_{1-10}$ alkanediyl, $C_{1-10}$ heteroalkanediyl, substituted $C_{1-10}$ alkanediyl, and substituted $C_{1-10}$ heteroalkanediyl.

In moieties of Formula (1) and prepolymers of Formula (1a) and (1b), $R^1$ can be $C_{2-10}$ alkanediyl.

In moieties of Formula (1) and prepolymers of Formula (1a) and (1b), $R^1$ can be $-[(CHR)_p-X-]_q(CHR)_r-$.

In moieties of Formula (1) and prepolymers of Formula (1a) and (1b), X can be selected from O and S, and thus $-[(CHR)_p-X-]_q(CHR)_r-$ can be $-[(CHR)_p-O-]_q(CHR)_r-$ or $-[(CHR)_p-S-]_q(CHR)_r-$. P and r can be equal, such as where p and r can both be two.

In moieties of Formula (1) and prepolymers of Formula (1a) and (1b), $R^1$ can be selected from $C_{2-6}$ alkanediyl and $-[(CHR)_p-X-]_q(CHR)_r-$.

In moieties of Formula (1) and prepolymers of Formula (1a) and (1b), $R^1$ can be $-[(CHR)_p-X-]_q(CHR)_r-$, and X can be O, or X can be S.

In moieties of Formula (1) and prepolymers of Formula (1a) and (1b), where $R^1$ can be $-[(CHR)_p-X-]_q(CHR)_r-$, p can be 2, r can be 2, q can be 1, and X can be S; or p can be 2, q can be 2, r can be 2, and X can be O; or p can be 2, r can be 2, q can be 1, and X can be O.

In moieties of Formula (1) and prepolymers of Formula (1a) and (1b), $R^1$ can be $-[(CHR)_p-X-]_q(CHR)_r-$, each R can be hydrogen, or at least one R can be methyl.

In moieties of Formula (1) and prepolymers of Formula (1a) and (1b), $R^1$ can be $-[(CH_2)_p-X-]_q(CH_2)_r-$ wherein each X can independently be selected from O and S.

In moieties of Formula (1) and prepolymers of Formula (1a) and (1b), $R^1$ can be $-[(CH_2)_p-X-]_q(CH_2)_r-$ each X can be O or each X can be S.

In moieties of Formula (1) and prepolymers of Formula (1a) and (1b), $R^1$ can be $-[(CH_2)_p-X-]_q(CH_2)_r-$, where p can be 2, X can be O, q can be 2, r can be 2, $R^2$ can be ethanediyl, m can be 2, and n can be 9.

In moieties of Formula (1) and prepolymers of Formula (1a) and (1b), each $R^1$ can be derived from 1,8-dimercapto-3,6-dioxaoctane (DMDO; 2,2-(ethane-1,2-diylbis(sulfanyl))bis(ethan-1-thiol)), or each $R^1$ can be derived from dimercaptodiethylsulfide (DMDS; 2,2'-thiobis(ethan-1-thiol)), and combinations thereof.

In moieties of Formula (1) and prepolymers of Formula (1a) and (1b), each p can independently be selected from 2, 3, 4, 5, and 6. Each p can be the same and can be 2, 3, 4, 5, or 6.

In moieties of Formula (1) and prepolymers of Formula (1a) and (1b), each q can independently be 1, 2, 3, 4, or 5. Each q can be the same and can be 1, 2, 3, 4, or 5.

In moieties of Formula (1) and prepolymers of Formula (1a) and (1b), each r can independently be 2, 3, 4, 5, 6, 7, 8, 9, or 10. Each r can be the same and can be 2, 3, 4, 5, 6, 7, 8, 9, or 10.

In moieties of Formula (1) and prepolymers of Formula (1a) and (1b), each r can independently be an integer from 2 to 4, from 2 to 6, or from 2 to 8.

In divinyl ethers of Formula (2), m can be an integer from 0 to 50, such as from 0 to 40, from 0 to 20, from 0 to 10, from 1 to 50, from 1 to 40, from 1 to 20, from 1 to 10, from 2 to 50, from 2 to 40, from 2 to 20, or from 2 to 10.

In divinyl ethers of Formula (2), each $R^2$ can independently be selected from a $C_{2-10}$ n-alkanediyl group, a $C_{3-6}$ branched alkanediyl group, and a $-[(CH_2)_p-X-]_q(CH_2)_r-$ group.

In divinyl ethers of Formula (2), each $R^2$ can independently be a $C_{2-10}$ n-alkanediyl group, such as methanediyl, ethanediyl, n-propanediyl, or n-butanediyl.

In divinyl ethers of Formula (2), each $R^2$ can independently comprise a —[(CH$_2$)$_p$—X—]$_q$(CH$_2$)$_r$— group, where each X can be O or S.

In divinyl ethers of Formula (2), each $R^2$ can independently comprise a —[(CH$_2$)$_p$—X—]$_q$(CH$_2$)$_r$— group.

In divinyl ethers of Formula (2), each m can be independently an integer from 1 to 3. Each m can be the same and can be 1, 2, or 3.

In divinyl ethers of Formula (2), each $R^2$ can independently be selected from a $C_{2-10}$ n-alkanediyl group, a $C_{3-6}$ branched alkanediyl group, and a —[(CH$_2$)$_p$—X—]$_q$(CH$_2$)$_r$— group.

In divinyl ethers of Formula (2), each $R^2$ can independently be a $C_{2-10}$ n-alkanediyl group.

In divinyl ethers of Formula (2), each $R^2$ can independently be a —[(CH$_2$)$_p$—X—]$_q$(CH$_2$)$_r$— group, where each X can be O or S.

In divinyl ethers of Formula (2), each $R^2$ can independently be a —[(CH$_2$)$_p$—X—]$_q$(CH$_2$)$_r$— group, where each X can be O or S, and each p can independently be 2, 3, 4, 5, and 6.

In divinyl ethers of Formula (2), each p can be the same and can be 2, 3, 4, 5, or 6.

In divinyl ethers of Formula (2), each $R^2$ can independently be a —[(CH$_2$)$_p$—X—]$_q$(CH$_2$)$_r$— group, where each X can be O or S, and each q can independently be 1, 2, 3, 4, or 5.

In divinyl ethers of Formula (2), each q can be the same and can be 1, 2, 3, 4, or 5.

In divinyl ethers of Formula (2), each $R^2$ can independently be a —[(CH$_2$)$_p$—X—]$_q$(CH$_2$)$_r$— group, where each X can be O or S, and each r can independently be 2, 3, 4, 5, 6, 7, 8, 9, or 10.

In divinyl ethers of Formula (2), each r can be the same and can be 2, 3, 4, 5, 6, 7, 8, 9, or 10. In divinyl ethers of Formula (2), each r can independently be an integer from 2 to 4, from 2 to 6, or from 2 to 8.

Examples of suitable divinyl ethers include ethylene glycol divinyl ether (EG-DVE), butanediol divinyl ether (BD-DVE) hexanediol divinyl ether (HD-DVE), diethylene glycol divinyl ether (DEG-DVE), triethylene glycol divinyl ether, tetraethylene glycol divinyl ether, polytetrahydrofuryl divinyl ether, cyclohexane dimethanol divinyl ether, and combinations of any of the foregoing.

A divinyl ether can comprise a sulfur-containing divinyl ether. Examples of suitable sulfur-containing divinyl ethers are disclosed, for example, in PCT Publication No. WO 2018/085650.

In moieties of Formula (1) each A can independently be derived from a polyalkenyl polyfunctionalizing agent. A polyalkenyl polyfunctionalizing agent can have the structure of Formula (3), where z can be 3, 4, 5, or 6.

In polyalkenyl polyfunctionalizing agents of Formula (3), each $R^7$ can independently be selected from $C_{1-10}$ alkanediyl, $C_{1-10}$ heteroalkanediyl, substituted $C_{1-10}$ alkanediyl, or substituted $C_{1-10}$ heteroalkanediyl. The one or more substituent groups can be selected from, for example, —OH, =O, $C_{1-4}$ alkyl, and $C_{1-4}$ alkoxy. The one or more heteroatoms can be selected from, for example, O, S, and a combination thereof.

Examples of suitable polyalkenyl polyfunctionalizing agents include triallyl cyanurate (TAC), triallylisocyanurate (TAIC), 1,3,5-triallyl-1,3,5-triazinane-2,4,6-trione), 1,3,5-triallyl-1,3,5-triazinane-2,4,6-trione), 1,3-bis(2-methylallyl)-6-methylene-5-(2-oxopropyl)-1,3,5-triazinone-2,4-dione, tris(allyloxy)methane, pentaerythritol triallyl ether, 1-(allyloxy)-2,2-bis((allyloxy)methyl)butane, 2-prop-2-ethoxy-1,3,5-tris(prop-2-enyl)benzene, 1,3,5-tris(prop-2-enyl)-1,3,5-triazinane-2,4-dione, and 1,3,5-tris(2-methylallyl)-1,3,5-triazinane-2,4,6-trione, 1,2,4-trivinylcyclohexane, trimethylolpropane trivinyl ether, and combinations of any of the foregoing.

In moieties of Formula (1) and prepolymers of Formula (1a)-(1b), the molar ratio of moieties derived from a divinyl ether to moieties derived from a polyalkenyl polyfunctionalizing agent can be, for example, from 0.9 mol % to 0.999 mol %, from 0.95 mol % to 0.99 mol %, or from 0.96 mol % to 0.99 mol %.

In moieties of Formula (1) and prepolymers of Formula (1a)-(1b), each $R^1$ can be —(CH$_2$)$_2$—O—(CH$_2$)—O—(CH$_2$)$_2$—; each $R^2$ can be —(CH$_2$)$_2$—; and m can be an integer from 1 to 4.

In moieties of Formula (1) and prepolymers of Formula (1a)-(1b), $R^2$ can be derived from a divinyl ether such a diethylene glycol divinyl ether, a polyalkenyl polyfunctionalizing agent such as triallyl cyanurate, or a combination thereof.

In moieties of Formula (1) and prepolymers of Formula (1a)-(1b), each A can independently be selected from a moiety of Formula (2a) and a moiety of Formula (3a):

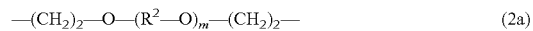

—(CH$_2$)$_2$—O—(R$^2$—O)$_m$—(CH$_2$)$_2$— (2a)

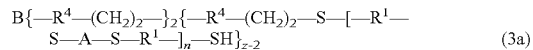

B{—R$^4$—(CH$_2$)$_2$—}$_2${—R$^4$—(CH$_2$)$_2$—S—[—R$^1$—S—A—S—R$^1$—]$_n$—SH}$_{z-2}$ (3a)

where m, $R^1$, $R^2$, $R^4$, A, B, m, n, and z are defined as in Formula (1), Formula (2), or Formula (3).

In moieties of Formula (1) and prepolymers of Formula (1a)-(1b), each $R^1$ can be —(CH$_2$)$_2$—O—(CH$_2$)$_2$—O—(CH$_2$)$_2$—; each $R^2$ can be —(CH$_2$)$_2$—; m can be an integer from 1 to 4; and the polyfunctionalizing agent B(—R$^4$—CH=CH$_2$)$_z$ comprises triallyl cyanurate where z is 3 and each $R^4$ is —O—CH$_2$—CH=CH$_2$.

Methods of synthesizing sulfur-containing polythioethers are disclosed, for example, in U.S. Pat. No. 6,172,179.

The backbone of a thiol-terminated polythioether prepolymer can be modified to improve the properties such as adhesion, tensile strength, elongation, UV resistance, hardness, and/or flexibility of sealants and coatings prepared using polythioether prepolymers. For example, adhesion promoting groups, antioxidants, metal ligands, and/or urethane linkages can be incorporated into the backbone of a polythioether prepolymer to improve one or more performance attributes. Examples of backbone-modified polythioether prepolymers are disclosed, for example, in U.S. Pat. No. 8,138,273 (urethane containing), U.S. Pat. No. 9,540,540 (sulfone-containing), U.S. Pat. No. 8,952,124 (bis(sulfonyl)alkanol-containing), U.S. Pat. No. 9,382,642 (metal-ligand containing), U.S. Application Publication No. 2017/0114208 (antioxidant-containing), PCT International Publication No. WO 2018/085650 (sulfur-containing divinyl ether), and PCT International Publication No. WO 2018/031532 (urethane-containing). Polythioether prepolymers include prepolymers described in U.S. Application Publication Nos. 2017/0369737 and 2016/0090507.

Examples of suitable thiol-terminated polythioether prepolymers are disclosed, for example, in U.S. Pat. No. 6,172,179. A thiol-terminated polythioether prepolymer can comprise Permapol® P3.1E, Permapol® P3.1E-2.8, Permapol® L56086, or a combination of any of the foregoing, each of which is available from PPG Aerospace. These Permapol® products are encompassed by the thiol-terminated polythioether prepolymers of Formula (2), (2a), and (2b). Thiol terminated polythioethers include prepolymers described in U.S. Pat. No. 7,390,859 and urethane-containing polythiols described in U.S. Application Publication Nos. 2017/0369757 and 2016/0090507.

A sulfur-containing prepolymer can comprise a polysulfide prepolymer or a combination of polysulfide prepolymers.

A polysulfide prepolymer refers to a prepolymer that contains one or more polysulfide linkages, i.e., —$S_x$— linkages, where x is from 2 to 4, in the prepolymer backbone. A polysulfide prepolymer can have two or more sulfur-sulfur linkages. Suitable thiol-terminated polysulfide prepolymers are commercially available, for example, from AkzoNobel and Toray Industries, Inc. under the tradenames Thioplast® and from Thiokol-LP®, respectively.

Examples of suitable polysulfide prepolymers are disclosed, for example, in U.S. Pat. Nos. 4,623,711; 6,172,179; 6,509,418; 7,009,032; and 7,879,955.

Examples of suitable thiol-terminated polysulfide prepolymers include Thioplast® G polysulfides such as Thioplast® G1, Thioplast® G4, Thioplast® G10, Thioplast® G12, Thioplast® G21, Thioplast® G22, Thioplast® G44, Thioplast® G122, and Thioplast® G131, which are commercially available from AkzoNobel. Thioplast® G resins are liquid thiol-terminated polysulfide prepolymers that are blends of di- and tri-functional molecules where the difunctional thiol-terminated polysulfide prepolymers have the structure of Formula (4) and the trifunctional thiol-terminated polysulfide polymers can have the structure of Formula (5):

(4)

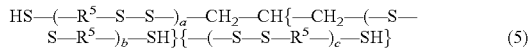

(5)

where each $R^5$ is —$(CH_2)_2$—O—$CH_2$—O—$(CH_2)_2$—, and d=a+b+c, where the value for d may be from 7 to 38 depending on the amount of the trifunctional cross-linking agent (1,2,3-trichloropropane; TCP) used during synthesis of the polysulfide prepolymer. Thioplast® G polysulfides can have a number average molecular weight from less than 1,000 Da to 6,500 Da, a SH content from 1% to greater than 5.5%, and a cross-linking density from 0% to 2.0%.

Polysulfide prepolymers can further comprise a terminal-modified polysulfide prepolymer having the structure of Formula (4a), a terminal modified polysulfide prepolymer having the structure of Formula (5a), or a combination thereof:

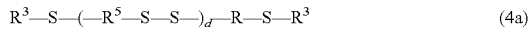

(4a)

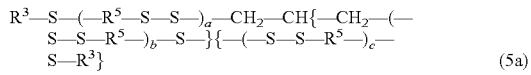

(5a)

where d, a, b, c, and $R^5$ are defined as for Formula (4) and Formula (5), and $R^3$ is a moiety comprising a terminal reactive group.

Examples of suitable thiol-terminated polysulfide prepolymers also include Thiokol® LP polysulfides available from Toray Industries, Inc. such as Thiokol® LP2, Thiokol® LP3, Thiokol™ LP12, Thiokol® LP23, Thiokol® LP33, and Thiokol® LP55. Thiokol® LP polysulfides have a number average molecular weight from 1,000 Da to 7,500 Da, a SH content from 0.8% to 7.7%, and a cross-linking density from 0% to 2%. Thiokol™ LP polysulfide prepolymers have the structure of Formula (6) and terminal-modified polysulfide prepolymers can have the structure of Formula (6a):

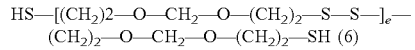

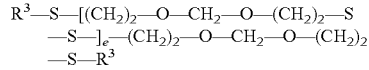

(6a)

where e can be such that the number average molecular weight from 1,000 Da to 7,500 Da, such as, for example an integer from 8 to 80, and each $R^3$ is a moiety comprising a terminal reactive functional group.

A thiol-terminated sulfur-containing prepolymer can comprise a Thiokol-LP® polysulfide, a Thioplast® G polysulfide, or a combination thereof.

Examples of thiol terminated polysulfide prepolymers of Formula (6a) and (6b) are disclosed, for example, in U.S. Application Publication No. 2016/0152775, in U.S. Pat. No. 9,079,833, and in U.S. Pat. No. 9,663,619.

A polysulfide prepolymer can comprise a polysulfide prepolymer comprising a moiety of Formula (7), a thiol terminated polysulfide prepolymer of Formula (7a), a terminal-modified polysulfide prepolymer of Formula (7b), or a combination of any of the foregoing:

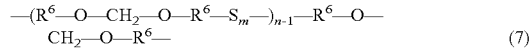

(7)

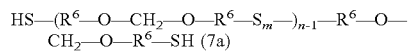

(7a)

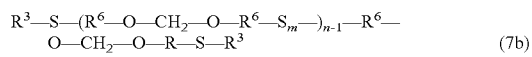

(7b)

where $R^6$ is $C_{2-4}$ alkanediyl, m is an integer from 1 to 8, and n is an integer from 2 to 370; and each $R^3$ is independently a moiety comprising a terminal reactive functional group.

In moieties of Formula (7) and prepolymers of Formula (7a)-(7b), m can have an average value, for example, greater than 1, such as from 1.05 to 2, or from 1.1 to 1.8.

In moieties of Formula (7) and prepolymers of Formula (7a)-(7b), m can be, for example, an integer from 1 to 6, and integer from 1 to 4, or an integer 1, 2, 3, 4, 5, 6, 7, or 8.

In moieties of Formula (7) and prepolymers of Formula (7a)-(7b), n can be, for example, an integer from 2 to 200 or an integer from 2 to 100.

In moieties of Formula (7) and prepolymers of Formula (7a)-(7b), each R can independently be selected from ethanediyl, 1,3-propanediyl, 1,1-propanediyl, 1,2-propanediyl, 1,4-butanediyl, 1,1-butanediyl, 1,2-butanediyl, and 1,3-butanediyl.

Polysulfide prepolymers of Formula (7) and polysulfide prepolymers of Formula (7a)-(7b), are disclosed, for example, in JP 62-53354.

A sulfur-containing prepolymer can comprise a sulfur-containing polyformal prepolymer or a combination of sulfur-containing polyformal prepolymers. Sulfur-containing polyformal prepolymers useful in sealant applications are disclosed, for example, in U.S. Pat. No. 8,729,216 and in U.S. Pat. No. 8,541,513.

A sulfur-containing polyformal prepolymer can comprise a moiety of Formula (8), a thiol-terminated sulfur-containing polyformal prepolymer of Formula (8a), a terminal-modified sulfur-containing polyformal prepolymer of Formula (8b), a thiol-terminated sulfur-containing polyformal prepolymer of Formula (8c), a terminal-modified sulfur-containing polyformal prepolymer of Formula (8d), or a combination of any of the foregoing:

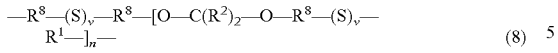

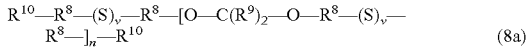

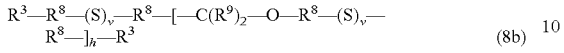

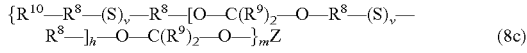

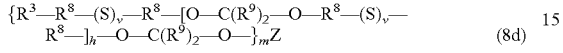

where h can be an integer from 1 to 50; each v can independently be selected from 1 and 2; each $R^8$ can be $C_{2-6}$ alkanediyl; and each $R^9$ can independently be selected from hydrogen, $C_{1-6}$ alkyl, $C_{7-12}$ phenylalkyl, substituted $C_{7-12}$ phenylalkyl, $C_{6-12}$ cycloalkylalkyl, substituted $C_{6-12}$ cycloalkylalkyl, $C_{3-12}$ cycloalkyl, substituted $C_{3-12}$ cycloalkyl, $C_{6-12}$ aryl, and substituted $C_{6-12}$ aryl; each $R^{1o}$ is a moiety comprising a terminal thiol group; and each $R^3$ is independently a moiety comprising a terminal reactive functional group other than a thiol group; and Z can be derived from the core of an m-valent parent polyol $Z(OH)_m$.

In sulfur-containing polyformal moieties of Formula (8) and prepolymers Formula (8a)-(8d), each $R^1$ can independently be selected from $C_{2-6}$ alkanediyl, $C_{2-4}$ alkanediyl, $C_{2-3}$ alkanediyl, and ethane-1,2-diyl.

In sulfur-containing polyformal moieties of Formula (8) and prepolymers Formula (8a)-(8d), each $R^1$ can be ethane-1,2-diyl.

In sulfur-containing polyformal moieties of Formula (8) and prepolymers Formula (8a)-(8d), each $R^2$ can independently be selected from hydrogen, $C_{1-6}$ alkyl, $C_{1-4}$ alkyl, $C_{1-3}$ alkyl, and $C_{1-2}$ alkyl. In sulfur-containing polyformal moieties of Formula (8) and prepolymers Formula (8a), each $R^2$ can be selected from hydrogen, methyl, and ethyl.

In sulfur-containing polyformal moieties of Formula (8) and prepolymers Formula (8a)-(8d), each $R^1$ is the same and can be selected from $C_{2-3}$ alkanediyl such as ethane-1,2-diyl and propane-1,3-diyl; and each $R^2$ is the same and can be selected from hydrogen and $C_{1-3}$ alkyl such as methyl, ethyl, or propyl. In sulfur-containing polyformal moieties of Formula (8) and prepolymers Formula (11a), each $R^1$ can be ethane-1,2-diyl.

In sulfur-containing polyformal moieties of Formula (8) and prepolymers Formula (11a)-(8d), each $R^2$ can be hydrogen. In sulfur-containing polyformal moieties of Formula (8) and prepolymers Formula (8a), each $R^1$ can be ethane-1,2-diyl and each $R^2$ can be hydrogen.

In sulfur-containing polyformal moieties of Formula (8) and prepolymers Formula (8a)-(8b), n can be an integer selected from 1 to 50, an integer from 2 to 40, an integer from 4 to 30, or n can be an integer from 7 to 30.

In sulfur-containing polyformal moieties of Formula (8) and prepolymers Formula (8a)-(8b), each p is the same and can be 1, and each p is the same and can be 2.

A sulfur-containing prepolymer can comprise a monosulfide prepolymer or a combination of monosulfide prepolymers.

A monosulfide prepolymer can comprise a moiety of Formula (9), a thiol-terminated monosulfide prepolymer of Formula (9a), a thiol-terminated monosulfide prepolymer of Formula (9b), a terminal-modified monosulfide prepolymer of Formula (9c), a terminal-modified monosulfide prepolymer of Formula (9d), or a combination of any of the foregoing:

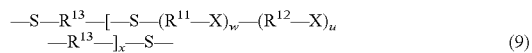

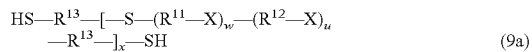

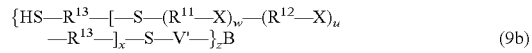

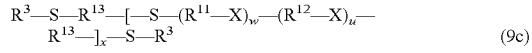

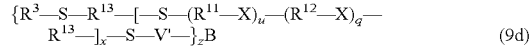

wherein, each $R^{11}$ can independently be selected from $C_{2-10}$ alkanediyl, such as $C_{2-6}$ alkanediyl; $C_{2-10}$ branched alkanediyl, such as $C_{3-6}$ branched alkanediyl or a $C_{3-6}$ branched alkanediyl having one or more pendant groups which can be, for example, alkyl groups, such as methyl or ethyl groups; $C_{6-8}$ cycloalkanediyl; $C_{6-14}$ alkylcycloalkyanediyl, such as $C_{6-10}$ alkylcycloalkanediyl; and $C_{8-10}$ alkylarenediyl;

each $R^{12}$ can independently be selected from hydrogen, $C_{1-10}$ n-alkanediyl, such as $C_{1-6}$ n-alkanediyl, $C_{2-10}$ branched alkanediyl, such as $C_{3-6}$ branched alkanediyl having one or more pendant groups which can be, for example, alkyl groups, such as methyl or ethyl groups; $C_{6-8}$ cycloalkanediyl; $C_{6-14}$ alkylcycloalkanediyl, such as $C_{6-10}$ alkylcycloalkanediyl; and $C_{8-10}$ alkylarenediyl;

each $R^{13}$ can independently be selected from hydrogen, $C_{1-10}$ n-alkanediyl, such as $C_{1-6}$ n-alkanediyl, $C_{2-10}$ branched alkanediyl, such as $C_{3-6}$ branched alkanediyl having one or more pendant groups which can be, for example, alkyl groups, such as methyl or ethyl groups; $C_{6-8}$ cycloalkanediyl group; $C_{6-14}$ alkylcycloalkanediyl, such as a $C_{6-10}$ alkylcycloalkanediyl; and $C_{8-10}$ alkylarenediyl;

each X can independently be selected from O and S;

w can be an integer from 1 to 5;

u can be an integer from 0 to 5; and x can be an integer from 1 to 60, such as from 2 to 60, from 3 to 60, or from 25 to 35;

each $R^3$ is independently selected from a reactive functional group;

B represents a core of a z-valent polyfunctionalizing agent $B(-V)_z$ wherein:

z can be an integer from 3 to 6; and each V can be a moiety comprising a terminal group reactive with a thiol group;

each —V'— can be derived from the reaction of —V with a thiol.

Methods of synthesizing thiol terminated monosulfide comprising moieties of Formula (10) or prepolymers of Formula (9b)-(9c) are disclosed, for example, in U.S. Pat. No. 7,875,666.

A monosulfide prepolymer can comprise a moiety of Formula (10), a thiol-terminated monosulfide prepolymer comprising a moiety of Formula (10a), comprise a thiol terminated monosulfide prepolymer of Formula (10b), a thiol-terminated monosulfide prepolymer of Formula (10c), a thiol-terminated monosulfide prepolymer of Formula (10d), or a combination of any of the foregoing:

$$-[-S-(R^{14}-X)_w-C(R^{15})_2-(X-R^{14})_u-]_x-S- \quad (10)$$

$$H-[-S-(R^{14}-X)_w-C(R^{15})_2-(X-R^{14})_u-]_x-SH \quad (10a)$$

$$R^3-[-S-(R^{14}-X)_w-C(R^{15})_2-(X-R^{14})_u-]_x-S-R^3 \quad (10b)$$

$$\{H-[-S-(R^{14}-X)_w-C(R^{15})_2-(X-R^{14})_u-]_x-S-V'-\}_zB \quad (10c)$$

$$\{R^3-[-S-(R^{14}-X)_w-C(R^{15})_2-(X-R^{14})_u-]_x-S-V'-\}_zB \quad (10d)$$

wherein,
- each $R^{14}$ can independently be selected from $C_{2-10}$ alkanediyl, such as $C_{2-6}$ alkanediyl; a $C_{3-10}$ branched alkanediyl, such as a $C_{3-6}$ branched alkanediyl or a $C_{3-6}$ branched alkanediyl having one or more pendant groups which can be, for example, alkyl groups, such as methyl or ethyl groups; a $C_{6-8}$ cycloalkanediyl; a $C_{6-14}$ alkylcycloalkyanediyl, such as a $C_{6-10}$ alkylcycloalkanediyl; and a $C_{8-10}$ alkylarenediyl;
- each $R^{15}$ can independently be selected from hydrogen, $C_{1-10}$ n-alkanediyl, such as a $C_{1-6}$ n-alkanediyl, $C_{3-10}$ branched alkanediyl, such as a $C_{3-6}$ branched alkanediyl having one or more pendant groups which can be, for example, alkyl groups, such as methyl or ethyl groups; a $C_{6-8}$ cycloalkanediyl group; a $C_{6-14}$ alkylcycloalkanediyl, such as a $C_{6-10}$ alkylcycloalkanediyl; and a $C_{8-10}$ alkylarenediyl;
- each X can independently be selected from O and S;
- w can be an integer from 1 to 5;
- u can be an integer from 1 to 5;
- x can be an integer from 1 to 60, such as from 2 to 60, from 3 to 60, or from 25 to 35;
- each $R^6$ is a moiety comprising a terminal functional group;
- B represents a core of a z-valent polyfunctionalizing agent $B(-V)_z$ wherein:
  - z can be an integer from 3 to 6; and
  - each V can be a moiety comprising a terminal group reactive with a thiol group;
- each —V'— can be derived from the reaction of —V with a thiol.

Methods of synthesizing monosulfides of Formula (10)-(10d) are disclosed, for example, in U.S. Pat. No. 8,466,220.

Other examples of chemically resistant prepolymers include polytetrafluorethylene, polyvinylidene difluoride, polyethylenetetrafluoroethylene, fluorinated ethylene propylene, perfluoroalkoxy, ethylene chlorotrifluorethylene, polychlorotrifluoroethylene, fluorinated ethylene propylene polymers polyamide, polyethylene, polypropylene, ethylene-propylene, fluorinated ethylene-propylene, polysulfone, polyarylether sulfone, polyether sulfone, polyimide, polyethylene terephthalate, polyetherketone, polyetherether ketone, polyetherimide, polyphenylene sulfide, polyarylsulfone, polybenzimidazole, polyamideimide, liquid crystal polymers, or combinations of any of the foregoing.

A coreactive composition can comprise a prepolymer that contains less than 10 wt % of sulfur atoms in the prepolymer backbone, where wt % is based on the total molecular weight of the prepolymer backbone, and/or prepolymers that do not contain sulfur atoms in the backbone provided that the cured coreactive composition exhibits acceptable chemical resistance.

For example, a prepolymer backbone having a low sulfur content or no sulfur content can comprise a polyformal, a polyisocyanate, a polyurea, polycarbonate, polyphenylene sulfide, polyethylene oxide, polystyrene, acrylonitrile-butadiene-styrene, polycarbonate, styrene acrylonitrile, poly(methylmethacrylate), polyvinylchloride, polybutadiene, polybutylene terephthalate, poly(p-phenyleneoxide), polysulfone, polyethersulfone, polyethylenimine, polyphenylsulfone, acrylonitrile styrene acrylate, polyethylene, syndiotactic or isotactic polypropylene, polylactic acid, polyamide, ethyl-vinyl acetate homopolymer or copolymer, polyurethane, copolymers of ethylene, copolymers of propylene, impact copolymers of propylene, polyetheretherketone, polyoxymethylene, syndiotactic polystyrene (SPS), polyphenylene sulfide (PPS), liquid crystalline polymer (LCP), homo- and copolymer of butene, homo- and copolymers of hexene; and combinations of any of the foregoing.

Examples of other suitable prepolymer backbones having low sulfur or no sulfur content include polyolefins (such as polyethylene, linear low density polyethylene (LLDPE), low density polyethylene (LDPE), high density polyethylene, polypropylene, and olefin copolymers), styrene/butadiene rubbers (SBR), styrene/ethylene/butadiene/styrene copolymers (SEB S), butyl rubbers, ethylene/propylene copolymers (EPR), ethylene/propylene/diene monomer copolymers (EPDM), polystyrene (including high impact polystyrene), poly(vinyl acetates), ethylene/vinyl acetate copolymers (EVA), poly(vinyl alcohols), ethylene/vinyl alcohol copolymers (EVOH), poly(vinyl butyral), poly(methyl methacrylate) and other acrylate polymers and copolymers (including such as methyl methacrylate polymers, methacrylate copolymers, polymers derived from one or more acrylates, methacrylates, ethyl acrylates, ethyl methacrylates, butyl acrylates, butyl methacrylates and the like), olefin and styrene copolymers, acrylonitrile/butadiene/styrene (ABS), styrene/acrylonitrile polymers (SAN), styrene/maleic anhydride copolymers, isobutylene/maleic anhydride copolymers, ethylene/acrylic acid copolymers, poly(acrylonitrile), polycarbonates (PC), polyamides, polyesters, liquid crystalline polymers (LCPs), poly(lactic acid), poly (phenylene oxide) (PPO), PPO-polyamide alloys, polysulfone (PSU), polyetherketone (PEK), polyetheretherketone (PEEK), polyimides, polyoxymethylene (POM) homo- and copolymers, polyetherimides, fluorinated ethylene propylene polymers (FEP), poly(vinyl fluoride), poly (vinylidene fluoride), poly(vinylidene chloride), and poly (vinyl chloride), polyurethanes (thermoplastic and thermosetting), aramides (such as Kevlar® and Nomex®), polytetrafluoroethylene (PTFE), polysiloxanes (including polydimethylenesiloxane, dimethylsiloxane/vinylmethylsiloxane copolymers, vinyldimethylsiloxane terminated poly (dimethylsiloxane)), elastomers, epoxy polymers, polyureas, alkyds, cellulosic polymers (such as ethyl cellulose, ethyl hydroxyethyl cellulose, carboxymethyl cellulose, cellulose acetate, cellulose acetate propionates, and cellulose acetate butyrates), polyethers and glycols such as poly (ethylene oxide)s (also known as poly(ethylene glycol)s, poly(propylene oxide)s (also known as poly(propylene glycol)s, and ethylene oxide/propylene oxide copolymers, acrylic latex polymers, polyester acrylate oligomers and polymers, polyester diol diacrylate polymers, and UV-curable resins.

Prepolymers having an elastomeric backbone and a low sulfur content or no sulfur content can also be used. Examples of suitable prepolymers having an elastomeric backbone include polyethers, polybutadienes, fluoroelastomers, perfluoroelastomers, ethylene/acrylic copolymers, ethylene propylene diene terpolymers, nitriles, polythiolamines, polysiloxanes, and combinations of any of the foregoing.

A sealing component can be fabricated by three-dimensionally printing using an aerospace sealant. Examples of suitable aerospace sealants are available from PPG Industries Inc. Suitable sealants include two-part manganese dioxide-cured polysulfide sealants such as PR-1440, PR-1429, PR-1770, two-part dichromate cured polysulfide sealants such as PR-1422, and two-part epoxy cured-polythioether sealants such as PR-2001. These sealants have an initial viscosity from 10,000 poise to 15,000 poise at 25° C. using a Brookfield rheometer with a #7 paddle at 2 rpm; an initial slump of from 0.10 inches to 0.15 inches and a slump at 50 minutes from 0.10 inches to 0.20 inches; a tack free time of less than 8 hours at 25° C.; and a cure time to a hardness of Shore 35A of from 12 hours to 48 hours.

A coreactive composition can comprise, for example, one or more additives such as, for example, catalysts, initiators such as photoinitiators, adhesion promoters, reactive diluents, plasticizers, filler, colorants, photochromic agents, rheology modifiers, cure activators and accelerators, corrosion inhibitors, fire retardants, or a combination of any of the foregoing.

A coreactive composition can comprise a filler or combination of filler. A filler can be included in a coreactive composition, for example, to adjust the viscosity of the coreactive composition, to establish the physical properties of a cured sealing component, to establish the density of a cured sealing component, and/or to establish the electrical and/or thermal properties of a cured sealing component.

A filler can comprise, for example, an inorganic filler, an organic filler, a low-density filler, an electrically conductive filler, a thermally conductive filler, or a combination of any of the foregoing.

Examples of suitable inorganic filler include silica, precipitated silica, treated silica, fumed silica, carbon black, calcium carbonate, precipitated calcium carbonate, calcium hydroxide, hydrated alumina (aluminum hydroxide), talc, mica, titanium dioxide, alumina silicate, carbonates, chalk, silicates, glass, metal oxides, graphite, and combinations of any of the foregoing.

Examples of suitable organic filler include thermoplastics, thermosets, or a combination thereof. Examples of suitable thermoplastics and thermosets include epoxies, epoxyamides, ETFE copolymers, nylons, polyethylenes, polypropylenes, polyethylene oxides, polypropylene oxides, polyvinylidene chlorides, polyvinylfluorides, TFE, polyamides, polyimides, ethylene propylenes, perfluorohydrocarbons, fluoroethylenes, polycarbonates, polyetheretherketones, polyetherketones, polyphenylene oxides, polyphenylene sulfides, polystyrenes, polyvinyl chlorides, melamines, polyesters, phenolics, epichlorohydrins, fluorinated hydrocarbons, polycyclics, polybutadienes, polychloroprenes, polyisoprenes, polysulfides, polyurethanes, isobutylene isoprenes, silicones, styrene butadienes, liquid crystal polymers, or combinations of any of the foregoing.

Examples of suitable low-density filler include thermally-expanded thermoplastic microcapsules and thermally-expanded microcapsules comprising an exterior coating of an aminoplast resin such as a melamine or a urea/formaldehyde resin. A low-density filler can have a specific gravity, for example, less than 0.5, less than 0.3, or less than 0.1.

A coreactive composition can comprise low density microcapsules. A low-density microcapsule can comprise a thermally expandable microcapsule.

A thermally expandable microcapsule refers to a hollow shell comprising a volatile material that expands at a predetermined temperature. Thermally expandable thermoplastic microcapsules can have an average initial particle size of 5 µm to 70 µm, in some cases 10 µm to 24 µm, or from 10 µm to 17 µm. The term "average initial particle size" refers to the average particle size (numerical weighted average of the particle size distribution) of the microcapsules prior to any expansion. The particle size distribution can be determined using a Fischer Sub-Sieve Sizer or by optical inspection.

Examples of materials suitable for forming the wall of a thermally expandable microcapsule include prepolymers of vinylidene chloride, acrylonitrile, styrene, polycarbonate, methyl methacrylate, ethyl acrylate, and vinyl acetate, copolymers of these monomers, and combinations of the prepolymers and copolymers. A crosslinking agent may be included with the materials forming the wall of a thermally expandable microcapsule.

Examples of suitable thermoplastic microcapsules include Expancel™ microcapsules such as Expancel™ DE microspheres available from AkzoNobel. Examples of suitable Expancel™ DE microspheres include Expancel™ 920 DE 40 and Expancel™ 920 DE 80. Suitable low-density microcapsules are also available from Kureha Corporation.

Low density filler such as low density microcapsules can be characterized by a specific gravity within a range from 0.01 to 0.09, from 0.04 to 0.09, within a range from 0.04 to 0.08, within a range from 0.01 to 0.07, within a range from 0.02 to 0.06, within a range from 0.03 to 0.05, within a range from 0.05 to 0.09, from 0.06 to 0.09, or within a range from 0.07 to 0.09, wherein the specific gravity is determined according to ISO 787-11. Low density filler such as low-density microcapsules can be characterized by a specific gravity less than 0.1, less than 0.09, less than 0.08, less than 0.07, less than 0.06, less than 0.05, less than 0.04, less than 0.03, or less than 0.02, wherein the specific gravity is determined according to ISO 787-11.

Low density filler such as low-density microcapsules can be characterized by a mean particle diameter from 1 µm to 100 µm and can have a substantially spherical shape. Low-density filler such as low-density microcapsules can be characterized, for example, by a mean particle diameter from 10 µm to 100 µm, from 10 µm to 60 µm, from 10 µm to 40 µm, or from 10 µm to 30 µm, as determined according to ASTM D6913.

Low-density filler such as low-density microcapsules can comprise expanded thermoplastic microcapsules or microballoons having a coating of an aminoplast resin such as a melamine resin. Aminoplast resin-coated particles are described, for example, in U.S. Pat. No. 8,993,691. Such microcapsules can be formed by heating a thermoplastic microcapsule comprising a blowing agent surrounded by a thermoplastic shell. Uncoated low-density microcapsules can be reacted with an aminoplast resin such as a urea/formaldehyde resin to provide a coating of a thermoset resin on the outer surface of the particle.

With the coating of an aminoplast resin, an aminoplast-coated microcapsule can be characterized by a specific gravity, for example, within a range from 0.02 to 0.08, within a range from 0.02 to 0.07, within a range from 0.02 to 0.06, within a range from 0.03 to 0.07, within a range from 0.03 to 0.065, within a range from 0.04 to 0.065, within a range from 0.045 to 0.06, or within a range from 0.05 to 0.06, wherein the specific gravity is determined according to ISO 787-11.

A coreactive composition can comprise micronized oxidized polyethylene homopolymer. An organic filler can include a polyethylenes, such as an oxidized polyethylene powder. Suitable polyethylenes are available, for example, from Honeywell International, Inc. under the tradename ACumist®, from INEOS under the tradename Eltrex®, and Mitsui Chemicals America, Inc. under the tradename Mipelon®.

Examples of suitable electrically conductive filler include metals, metal alloys, conductive oxides, semiconductors, carbon, carbon fiber, and combinations of any of the foregoing.

Other examples of electrically conductive filler include electrically conductive noble metal-based filler such as pure silver; noble metal-plated noble metals such as silver-plated gold; noble metal-plated non-noble metals such as silver plated cooper, nickel or aluminum, for example, silver-plated aluminum copper particles or platinum-plated copper particles; noble-metal plated glass, plastic or ceramics such as silver-plated glass microspheres, noble-metal plated aluminum or noble-metal plated plastic microspheres; noble-metal plated mica; and other such noble-metal conductive filler. Non-noble metal-based materials can also be used and include, for example, non-noble metal-plated non-noble metals such as copper-coated iron particles or nickel-plated copper particles; non-noble metals, e.g., copper, aluminum, nickel, cobalt; non-noble-metal-plated-non-metals, e.g., nickel-plated graphite and non-metal materials such as carbon black and graphite. Combinations of electrically conductive filler and shapes of electrically conductive filler can be used to achieve a desired conductivity, EMURFI shielding effectiveness, hardness, and other properties suitable for a particular application.

Electrically conductive non-metal filler, such as carbon nanotubes, carbon fibers such as graphitized carbon fibers, and electrically conductive carbon black, can also be used in coreactive compositions in combination with graphene.

A coreactive composition can comprise a thermally-conductive filler or combination of thermally-conductive filler.

A thermally conductive filler can include, for example, metal nitrides such as boron nitride, silicon nitride, aluminum nitride, boron arsenide, carbon compounds such as diamond, graphite, carbon black, carbon fibers, graphene, and graphenic carbon particles, metal oxides such as aluminum oxide, magnesium oxide, beryllium oxide, silicon dioxide, titanium oxide, nickel oxide, zinc oxide, copper oxide, tin oxide, metal hydroxides such as aluminum hydroxide or magnesium hydroxide, carbides such as silicon carbide, minerals such as agate and emery, ceramics such as ceramic microspheres, mullite, silica, silicon carbide, carbonyl iron, cerium (III) molybdate, copper, zinc, or combinations of any of the foregoing.

A coreactive composition can comprise, for example, from 1 wt % to 90 wt % of filler, from 1 wt % to 60 wt %, from 1 wt % to 40 wt %, from 1 wt % to 20 wt %, from 1 wt % to 10 wt %, or from 1 wt % to 5 wt % of filler, where wt % is based on the total weight of the coreactive composition. A coreactive composition can comprise greater than 1 wt % filler, greater than 5 wt %, greater than 10 wt %, greater than 20 wt %, greater than 30 wt %, greater than 40 wt %, greater than 50 wt % filler, or greater than 60 wt % filler, where wt % is based on the total weight of the coreactive composition. A coreactive composition can comprise less than 90 wt %, less than 70 wt %, less than 50 wt %, less than 30 wt %, less than 10 wt % filler, or less than 5 wt %, where wt % is based on the total weight of the coreactive composition.

A coreactive composition can comprise, for example, from 1 vol % to 90 vol % of filler, from 1 vol % to 60 vol %, from 1 vol % to 40 vol %, from 1 vol % to 20 vol %, from 1 vol % to 10 vol %, or from 1 vol % to 5 vol % of filler, where vol % is based on the total volume of the coreactive composition. A coreactive composition can comprise greater than 1 vol % filler, greater than 5 vol %, greater than 10 vol %, greater than 20 vol %, greater than 30 vol %, greater than 40 vol %, greater than 50 vol % filler, or greater than 60 vol % filler, where vol % is based on the total volume of the coreactive composition. A coreactive composition can comprise less than 90 vol %, less than 70 vol %, less than 50 vol %, less than 30 vol %, less than 10 vol % filler, or less than 5 vol %, where vol % is based on the total volume of the coreactive composition.

Materials forming coreactive composition used to fabricate sealing components can be selected to provide desired chemical properties, desired physical properties and to facilitate three-dimensional printing.

A coreactive composition can be capable of reacting, for example, at a temperature less than 50° C., less than 40° C., less than 30° C., or less than 20° C. The first and second functional groups can be capable of reacting, for example, at a temperature from 10° C. to 50° C., from 15° C. to 40° C., or from 20C to 30° C. The first and second functional groups can be capable of reacting, for example, at a temperature greater than 10° C., greater than 20° C., greater than 30° C., or greater than 40° C.

A coreactive composition can have an initial, as deposited, viscosity, for example, from 1E2 poise to 1E7 poise, from 5E2 poise to 5E6 poise, from 1E3 poise to 1E5 poise, or from 5E3 poise to 5E4 poise, where viscosity is determined using a Brookfield rheometer fitted with a #7 paddle at 2 rpm and 25° C. A coreactive composition can have an initial viscosity, for example, greater than 1E2 poise, greater than 5E2 poise, greater than 1E3 poise, greater than 5E3 poise, greater than 1E4 poise, greater than 1E5 poise, or greater than 1E6poise. A coreactive composition can have an initial viscosity, for example, less than 1E7 poise, less than 1E6 poise, less than 1E5 poise, less than 1E4 poise, or less than 1E3 poise.

A coreactive composition for fabricating sealing components can have a gel time, for example, of less than 12 hours, less than 8 hours, less than 4 hours, less than 1 hour, less than 30 minutes, less than 10 minutes, or less than 1 at 23C/50% RH. A coreactive composition for fabricating sealing components can have a gel time, for example, from 10 seconds to 12 hours, from 1 minute to 8 hours, from 30 minutes to 4 hours, or from 1 hour to 3 hours at 23C/50% RH. A coreactive composition for fabricating sealing components can have a gel time, for example, of greater than 10 seconds, greater than 1 minute, greater than 30 minutes, greater than 1 hour, greater than 4 hours, or greater than 8 hours. Gel time refers the duration from the time when curing of the coreactive composition is initiated, for example, either by mixing of coreactive components or by exposure to energy such as UV radiation, to when the coreactive composition is no longer stirrable by hand.

A coreactive composition for fabricating a sealing component can have a tack free, for example, of less than 24 hours, less than 10 hours, less than 1 hour, less than 30 minutes, less than 10 minutes or less than 5 minutes at 23° C./50% RH A coreactive composition for fabricating a sealing component can have a tack free time, for example, greater than 10 seconds, greater than 1 minute, greater than 1 hour, greater than 6 hours, or greater than 12 hours at 23° C./50% RH A coreactive composition for fabricating a sealing component can have a tack free, for example, from 30 seconds to 24 hours, from 1 minute to 12 hours, from 1 hour to 10 hours, or from 2 hours to 8 hours at 23° C./50% RH . Tack free time" refers to the duration from the time when curing of the coreactive composition is initiated, for example, either by mixing of coreactive components or by exposure to energy such as UV radiation, to the time when a layer prepared from the coreactive composition is no longer tack free, where tack free is determined by applying a polyethylene sheet to the surface of the layer with hand pressure and observing whether sealant adheres to the surface of the polyethylene sheet, where the layer is considered to be tack free if the polyethylene sheet separates easily from the layer.

A coreactive composition can have a time to a hardness of Shore 10A, for example, of less than 2 minutes, less than 5 minutes, less than 30 minutes, less than 1 hour, less than 5 hours, less than 10 hours, or less than 20 hours. at 23° C./50% RH. A coreactive composition can have a time to a hardness of Shore 10A, for example, of greater than 30 seconds, greater than 1 minute, greater than 1 hour, greater than 5 hours, or greater than 10 hours at 23° C./50% RH. A coreactive composition can have a time to a hardness of Shore 10A, for example, from 30 seconds to 20 hours, from minute to 12 hours, or from 1 hour to 10 hours, at 23° C./50% RH.

A coreactive composition can have a cure time such as the time to a hardness of Shore 30A of from 1 day to 7 days at 23° C./50% RH.

A sealing component can be fabricated by depositing successive layers of a coreactive composition using three-dimensional printing. The successive layers can be deposited adjoining a previously deposited layer such as next to a previously deposited layer, on top of a previously deposited layer, or against a previously deposited layer such as on the side of a previously deposited. A successive layer can be deposited adjoining one or more previously deposited layers.

During fabrication of a sealing component, the amount of a coreactive composition can be constant or can be variable. For example, the amount of the coreactive composition can be adjusted to change the thickness of the part and/or to form high tolerance features.

A coreactive composition can be deposited, for example, at temperatures less than 50° C., less than 40° C., less than 30° C., less than 25° C., less than 20° C., or less than 15° C. A coreactive composition can be deposited at a temperature, for example, from 10° C. to 50° C., from 15° C. to 40° C., or from 20° C. to 30° C. The deposition temperature refers to the temperature of the coreactive composition in the nozzle of the three-dimensional printing apparatus, immediately after the coreactive composition leaves the nozzle, and/or as the coreactive composition is being deposited on a substrate.

A coreactive composition can be deposited on a substrate, which includes a support or a previously deposited layer of the coreactive composition. A coreactive composition, such one or more successive layers comprising a coreactive composition, can be deposited directly onto the surface to be sealed.

The speed and order in which successive layers of a coreactive composition are deposited can be selected to facilitate the ability of adjoining layers of the deposited coreactive composition to interact to form a strong interface between adjoining layers, which as described herein, can include, for example, chemical bonding and/or entanglement between constituents of adjoining layers. Adjoining layers of a coreactive composition can chemically bond to form a mechanically strong interface between layers. Adjoining layers can physically interact to from a strong interface between adjoining layers. For example, constituents of one or both adjoining layers can diffuse into the other layer to form a mechanically strong interface.

For example, a subsequently applied layer of a coreactive composition can be applied onto a previously applied layer before the gel time of the gel time of the previously applied coreactive composition. For example, a subsequently applied layer of a coreactive composition can be applied onto a previously applied layer before the surface of the previously applied coreactive composition has fully reacted. A subsequently applied layer can also be applied to a partially cured or to a fully cured previously deposited layer.

Three-dimensional printing using coreactive compositions facilitates the ability to fabricate high-precision sealing components having complex geometries and having physical properties at least comparable to sealing components formed using other processes. Coreactive three-dimensional printing provides the ability to use a wide range of reactive materials and curing chemistries. The low viscosity o the reactive monomers and prepolymers can facilitate the ability to use a higher filler content not accessible to other three-dimensional printing methods such as thermoplastic three-dimensional printing. Three-dimensional printing of sealing components using three-dimensional printing can be done using versatile, processor-controlled equipment that can be modified as desired to produce a wide variety of parts. Furthermore, the low temperature processing and curing of coreactive compositions can provide sealing components with low mechanical stress. Coreactive three-dimensional printing facilitates the ability of fabricate customized sealing component and/or low production volume sealing components without the need to invest in costly tooling and equipment as necessary in other methods such as injection molding and compression molding.

For sealing opposing surfaces it can be desirable that the surfaces of a sealing component be smooth to facilitate mating with a surface and to avoid the creation of pockets between the sealing component surface and the mating surface of the part to be sealed. The pockets, which can contain gas or solvent or which can fill with and retain gas or solvent during use, can compromise the integrity of the sealing component seal during use. For sealing components fabricated using three-dimensional printing it is therefore desired that the sealing component surface be smooth. It is well known that certain three-dimensional printing methods can produce print lines, which create rough surfaces that may not be desirable for certain sealing application such as sealing smooth surfaces of opposing parts.

To facilitate fabrication of smooth sealing component surfaces using three-dimensional printing, the tip of the extrusion nozzle can be positioned near the surface of the initially deposited coreactive composition. For example, the tip of the nozzle can be positioned from 2 mm above the initially deposited surface to 2 mm below the initially deposited surface, such as from 1.5 mm above to 1.5 mm below the surface, from 1 mm above to 1 mm below, or from 0.5 mm above to 0.5 mm below the initially deposited surface. The tip of the nozzle can be positioned, for example, from level with the initially deposited surface to 2 mm below the surface, from level with to 1.5 mm below the surface, from level with to 1 mm below the surface, or from level with to 0.5 mm below the initially deposited surface.

Figure 2A:
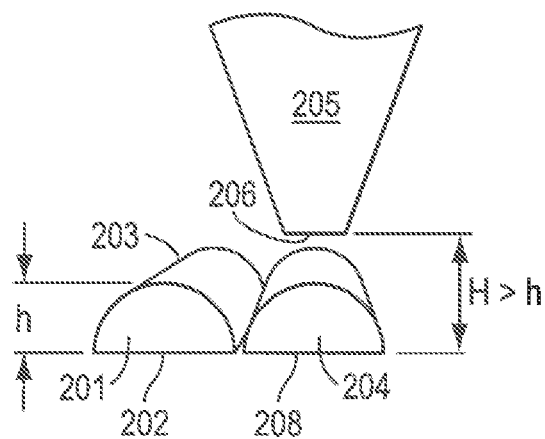
FIGS. 2A-2C show views of different positions of a three-dimensional printing nozzle with respect to a layer being deposited and an adjoining layer.
Figure 2B:
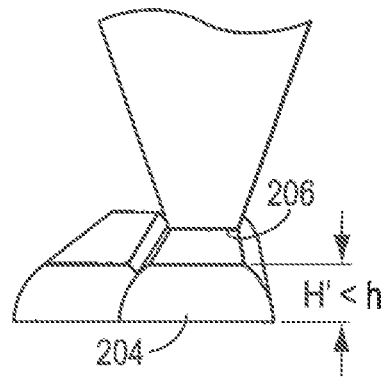
Figure 2C:
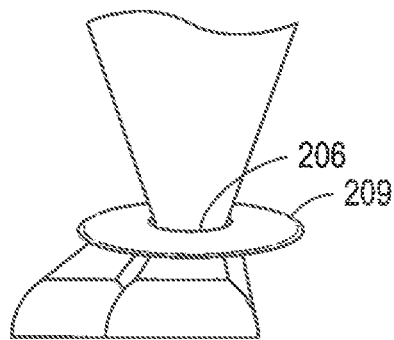

The spatial relationship of the nozzle with respect to the initially deposited surface of the coreactive composition is shown in FIG. 2A-2C. FIG. 2A shows a three-dimensional printing nozzle positioned above a layer of a coreactive composition. FIG. 2A shows a previously deposited layer 201 having a first height h, which is the distance between the substrate 202 or bottom of the deposited layer to the highest point of the previously deposited layer 203. Layer 204 is in the process of being deposited from nozzle 205. Layer 204 has the same height h as the previously deposited layer 201. The tip 206 of nozzle 205 is positioned above the top 207 of layer 204 at a height H from the substrate or bottom 208 of layer 204.

In FIG. 2B the height H' of the nozzle above the substrate is less than the height h of the freely deposited layer 204 shown in FIG. 2A. As shown in FIG. 2B, reducing the height of the nozzle below the height h of the freely deposited layer causes the nozzle tip 206 to drag along the layer deposition and results in a spreading of the deposited layer. The coreactive composition being deposited is spread into the gap between the adjoining layers. As illustrated in FIG. 2B, this results in a surface profile in which the height of the print lines, or the difference between the low and high topographical features are reduced.

FIG. 2C shows an example in which the nozzle tip 206 has been modified to include an element 209 such as a blade that facilitates the ability of the nozzle tip to smooth the surface of the deposited layers. As shown in FIG. 2C, the element is in the form of a disc configured to extend over at least a portion of a previously deposited layer such that while the second layer is being deposited, both the first and second layers are simultaneously smoothed.

These examples demonstrate that various mechanisms and features can be used to smooth the surface of a part such as a sealing component using coreactive three-dimensional printing.

Thus, methods provided by the present disclosure can comprise extruding a coreactive composition through a nozzle onto a substrate, wherein the nozzle comprises a tip; a deposited layer is characterized by a first layer thickness when the distance between the substrate and the nozzle tip is greater than the first layer thickness; and depositing further comprises positioning the nozzle tip at a distance from the substrate that is less than the first layer thickness and extruding the coreactive composition through the nozzle. During deposition the tip of the nozzle can contact the layer being deposited and can be dragged along the layer being deposited during printing. The result is a print layer that has a height that is less than the height of a freely deposited print layer in which the tip of the nozzle is positioned above the deposited layer and therefore does not contact the layer during printing.

The tip of the printing nozzle can be positioned, for example, less than 1 mm below the height of a freely deposited layer, less than 2 mm below, less than 3 mm below, or less than 5 mm below the height of a freely deposited layer. The tip of the printing nozzle can be positioned more than 0.1 mm below the height of a freely deposited layer, more than 0.2 mm, more than 0.5 mm, more than 1 mm, more than 2 mm, or more than 4 mm below the height of a freely deposited layer. A suitable position of the nozzle with respect to the surface of a deposited layer can depend on the dimensions of the deposited layer, the viscosity of the coreactive composition being deposited, and/or the print speed.

By positioning the extrusion nozzle below the initially deposited surface of the coreactive composition can reduce the surface waviness and provide three-dimensionally printed surfaces that are suitable for sealing component applications without further processing. For example, the sealing component surfaces are sufficiently smooth that it is not necessary to abrade or coat the sealing component surface to obtain a suitable smoothness.

After the successive layers of a coreactive composition are deposited to form a sealing component, the deposited coreactive composition can be cured.

The deposited coreactive composition can be cured, for example, at temperatures less than 50° C., less than 40° C., less than 30° C., less than 25° C., less than 20° C., or less than 15° C. A coreactive composition can be cured at a temperature, for example, from 10° C. to 50° C., from 15° C. to 40° C., or from 20° C. to 30° C. A coreactive composition can be cured at a temperature, for example from 22° C. to 25° C.

The curing conditions can be selected to allow adjoining layers to form a strong interface and/or to facilitate the coreactive composition on the surface of the sealing component to planarize.

To further facilitate the ability of the adjoining layers to interact and/or to allow the sealing component surface to planarize, the deposited coreactive composition can be continuously or temporarily heated. Heating can increase the reaction rate or rate of entanglement of the coreactants between adjoining layers and/or can decrease the viscosity of the coreactive composition on the sealing component surface. However, heating is not required to smooth the surfaces and/or to create a strong interlayer interface.

During cure, a portion of the top surface of a sealing component can be heated or the entire top surface can be heated.

A sealing component provided by the present disclosure can be formed by depositing a coreactive composition on any suitable substrate. After the sealing component is formed and cured, the sealing component can be removed from the substrate.

A coreactive composition can be deposited, for example, on a metal or plastic substrate. A release coating can be applied to the substrate before depositing the coreactive composition to facilitate removing the cured sealing component from the substrate.

A coreactive composition can be deposited onto a release film to form a sealing component. The release film can serve as a carrier for the sealing component and the sealing component can be removed from the release film at the time of use.

A sealing component can be formed in place by depositing a coreactive composition directly onto a surface to be sealed by the sealing component.

A substrate can have a substantially planar surface or can have a non-planar surface A sealing component having a non-planar bottom surface can be formed by depositing a coreactive composition onto a non-planar substrate. The substrate can have angled surfaces, insets, depressions, curved, or any other shaped surface. The deposited coreactive composition can conform to the shape of the substrate. The substrate can have the same shape to that of one of the surfaces to be sealed with the sealing component, or the substrate can have a shape similar to the of one of the surfaces to be sealed with the sealing component.

The surface of the substrate onto which a coreactive composition is deposited can be smooth. For example, a substrate surface can have an 2 Ra surface waviness of less than 200 μm, less than 100 μm, less than 50 μm, 10 μm, less than 5 μm, less than 1 μm, or less than 0.1 μm. For example, a substrate surface can have an 2 Ra surface waviness from 0.01 µm to 200 µm, from 0.1 µm to 100 µm, from 0.2 µm to 50 µm, or from 1 µm to 20 µm.

Because a coreactive composition is deposited onto the substrate at temperatures less than 50° C. or less than 30° C., a substrate is not required to withstand high temperatures.

A substrate, such as a metal substrate may be heated or cooled to facilitate interlayer bonding, controlling the cure rate of the deposited coreactive composition, and/or controlling the viscosity of the deposited coreactive composition.

A sealing component can be fabricated by depositing a coreactive composition directly onto a surface to be sealed using three-dimensional printing. Using direct deposition, the nozzle of the coreactive three-dimensional printing apparatus can be articulated consistent with the profile of the part to be sealed to facilitate the ability of the deposited coreactive composition to fill and conform to complex shapes. The coreactive composition can also be deposited in a manner that allows avoids or minimizes entrapment of air and the creation of pockets between the cured material and the surfaces of the part to be sealed. A coreactive composition for depositing directly onto a surface to be sealed can comprise constituents that facilitate the ability of the sealing component to bond and/or adhere to the surface.

A sealing component can have properties suitable for a specific use application. Relevant properties include chemical resistance, low-temperature flexibility, hydrolytic stability, high temperature resistance, tensile strength, tensile strain, % elongation, compression set, substrate adhesion, tack-free time, time to Shore 10A hardness, electrical conductivity, static dissipation, thermal conductivity, low-density, corrosion resistance, surface hardness, fire retardance, UV resistance, dielectric breakdown strength, and combinations of any of the foregoing.

For aerospace applications important properties include, chemical resistance such as resistance to fuels, hydraulic fluids, oils, greases, lubricants and solvents, low temperature flexibility, high temperature resistance, ability to dissipate electrical charge, and dielectric breakdown strength.

For example, following exposure to Jet Reference Fluid (JRF Type 1) according to ISO 1817 for 168 hours at 60° C., a cured composition provided can exhibit a tensile strength greater than 1.4 MPa determined according to ISO 37, a tensile elongation greater than 150% determined according to ISO 37, and a hardness greater than Shore 30A determined according to ISO 868, where the tests are performed at a temperature of 23° C., and a humidity of 55% RH. Following exposure to de-icing fluid according to ISO 11075 Type 1 for 168 hours at 60° C., a cured composition can exhibit a tensile strength greater than 1 MPa determined according to ISO 37, and a tensile elongation greater than 150% determined according to ISO 37, where the tests are performed at a temperature of 23° C., and a humidity of 55% RH. Following exposure to phosphate ester hydraulic fluid (Skydrol® LD-4) for 1,000 hours at 70° C., a cured composition can exhibit a tensile strength greater than 1 MPa determined according to ISO 37, a tensile elongation greater than 150% determined according to ISO 37, and a hardness greater than Shore 30A determined according to ISO 868, where the tests are performed at a temperature of 23° C., and a humidity of 55% RH. A chemically resistant composition can exhibit a % swell less than 25%, less than 20%, less than 15%, or less than 10%, following immersion in a chemical for 7 days at 70° C., where % swell is determined according to EN ISO 10563.

A sealing component can exhibit a hardness, for example, greater than Shore 20A, greater than Shore 30A, greater than Shore 40A, greater than Shore 50A, or greater than Shore 60A, where hardness is determined according to ISO 868 at 23° C./55% RH.

A sealing component can exhibit a tensile elongation of at least 200% and a tensile strength of at least 200 psi when measured in accordance with the procedure described in AMS 3279, § 3.3.17.1, test procedure AS5127/1, § 7.7.

A sealing component can exhibit a lap shear strength of greater than 200 psi (1.38 MPa), such as at least 220 psi (1.52 MPa), at least 250 psi (1.72 MPa), and, in some cases, at least 400 psi (2.76 MPa), when measured according to the procedure described in SAE AS5127/1 paragraph 7.8.

A sealing component prepared from a coreactive composition provided by the present disclosure can meet or exceed the requirements for aerospace sealants as set forth in AMS 3277.

A sealing component can exhibit properties acceptable for use in vehicle and aerospace sealant applications. In general, it is desirable that sealants used in aviation and aerospace applications exhibit the following properties: peel strength greater than 20 pounds per linear inch (pli) on Aerospace Material Specification (AMS) 3265B substrates determined under dry conditions, following immersion in JRF Type I for 7 days, and following immersion in a solution of 3% NaCl according to AMS 3265B test specifications; tensile strength between 300 pounds per square inch (psi) and 400 psi (2.75 MPa); tear strength greater than 50 pounds per linear inch (pli) (8.75 N/mm); elongation between 250% and 300%; and hardness greater than 40 Durometer A. These and other cured sealant properties appropriate for aviation and aerospace applications are disclosed in AMS 3265B. It is also desirable that, when cured, compositions of the present disclosure used in aviation and aircraft applications exhibit a percent volume swell not greater than 25% following immersion for one week at 60° C. (140° F.) and ambient pressure in Jet Reference Fluid (JRF) Type 1. Other properties, ranges, and/or thresholds may be appropriate for other sealant applications.

A sealing component can have a specific gravity, for example, less than 1.3, less than 1.2, less than 1.1, less than 1.0, less than 0.9, less than 0.8, or less than 0.7.

A sealing component exhibits a glass transition temperature Tg, for example, of less than −20° C., less than −40° C., less than −50° C., or less than −60° C., determined by dynamic mechanical analysis (DMA) using a TA Instruments Q800 apparatus with a frequency of 1 Hz, an amplitude of 20 microns, and a temperature ramp of −80° C. to 160° C., with the $T_g$ identified as the peak of the tan δ curve.

A sealing component fabricated using methods provided by the present disclosure can be used to seal adjoining surfaces.

A sealing component can be used to seal adjoining surface on a vehicle such as an automotive vehicle or an aerospace vehicle.

A vehicle can include, for example, motor vehicles, automobiles, trucks, buses, vans, motorcycles, scooters, recreational motor vehicles; railed vehicles trains, trams, bicycles, aerospace vehicles, airplanes, rockets, spacecraft, jets, helicopters, military vehicles including jeeps, transports, combat support vehicles, personnel carriers, infantry fighting vehicles, mine-protected vehicles, light armored vehicles, light utility vehicles, military trucks, watercraft including ships, boats, and recreational watercraft. The term vehicle is used in its broadest sense and includes all types of aircraft, spacecraft, watercraft, and ground vehicles. For example, a vehicle can include, aircraft such as airplanes including private aircraft, and small, medium, or large commercial passenger, freight, and military aircraft; helicopters, including private, commercial, and military helicopters; aerospace vehicles including, rockets and other spacecraft. A vehicle can include a ground vehicle such as, for example, trailers, cars, trucks, buses, vans, construction vehicles, golf carts, motorcycles, bicycles, trains, and railroad cars. A vehicle can also include watercraft such as, for example, ships, boats, and hovercraft.

A sealing component can be used to seal adjoining surface on parts of an aerospace vehicle. Examples of aerospace vehicles include F/A-18 jet or related aircraft such as the F/A-18E Super Hornet and F/A-18F; in the Boeing 787 Dreamliner, 737, 747, 717 passenger jet aircraft, a related aircraft (produced by Boeing Commercial Airplanes); in the V-22 Osprey; VH-92, S-92, and related aircraft (produced by NAVAIR and Sikorsky); in the G650, G600, G550, G500, G450, and related aircraft (produced by Gulfstream); and in the A350, A320, A330, and related aircraft (produced by Airbus). A sealing component can be used in any suitable commercial, military, or general aviation aircraft such as, for example, those produced by Bombardier Inc. and/or Bombardier Aerospace such as the Canadair Regional Jet (CRJ) and related aircraft; produced by Lockheed Martin such as the F-22 Raptor, the F-35 Lightning, and related aircraft; produced by Northrop Grumman such as the B-2 Spirit and related aircraft; produced by Pilatus Aircraft Ltd.; produced by Eclipse Aviation Corporation; or produced by Eclipse Aerospace (Kestrel Aircraft).

Vehicles such as automotive vehicles and aerospace vehicles comprising sealed with a sealing component fabricated using a method provided by the present disclosure are also included within the scope of the invention.

ASPECTS OF THE INVENTION

The invention is further defined by the following aspects:

Aspect 1. A method of making a chemically resistant sealing component, comprising depositing successive layers of a coreactive composition in a predetermined shape using three-dimensional printing; and curing the deposited coreactive composition to provide a chemically resistant sealing component, wherein a fracture energy of the fully cured sealing component is substantially the same as a fracture energy of an individual layer, wherein the fracture energy is determined according to ASTM D7313.

Aspect 2. The method of aspect 2, wherein the sealing component comprises a gasket, a shim, a washer, a grommet, an O-ring, a spacer, a seal, a packing, a cushion, a mating material, a flange, or a bushing.

Aspect 3. The method of any one of aspects 1 to 2, wherein curing comprises causing the hardness of the sealing component to reach 90% of a maximum hardness.

Aspect 4. The method of any one of aspects 1 to 3, wherein depositing and curing comprises causing adjoining layers of the successively deposited layers to chemically bond and/or to physically bond.

Aspect 5. The method of any one of aspects 1 to 4, wherein depositing comprises extruding.

Aspect 6. The method of any one of aspects 1 to 5, wherein, depositing comprises extruding the coreactive composition through a nozzle onto a substrate, wherein the nozzle comprises a tip; a deposited layer is characterized by a first layer thickness when the distance between the substrate and the nozzle tip is greater than the first layer thickness; and depositing further comprises positioning the nozzle tip at a distance from the substrate that is less than the first layer thickness and extruding the coreactive composition through the nozzle.

Aspect 7. The method of aspect 6, wherein the substrate comprises a support or a previously deposited layer.

Aspect 8. The method of any one of aspects 6 to 7, wherein positioning the nozzle at a distance from the substrate that is less than the first layer thickness and extruding the coreactive composition through the nozzle forms a deposited layer having a second layer thickness, wherein the second layer thickness is less than the first layer thickness.

Aspect 9. The method of any one of aspects 6 to 8, wherein the nozzle tip further comprises a component configured to smooth a deposited layer.

Aspect 10. The method of aspect 9, wherein the component is configured to reduce the average 2 Ra waviness of a surface of the sealing component to less than 10% the average waviness wavelength.

Aspect 11. The method of any one of aspects 1 to 10, wherein during deposition the coreactive composition has a temperature less than 50° C.

Aspect 12. The method of any one of aspects 1 to 11, wherein depositing comprises depositing onto a substrate or onto a previously deposited layer.

Aspect 13. The method of any one of aspects 1 to 12, wherein depositing comprises depositing the coreactive composition adjoining a previously deposited layer, wherein the previously deposited layer is fully cured.

Aspect 14. The method of any one of aspects 1 to 12, wherein depositing comprises depositing the coreactive composition adjoining a previously deposited layer, wherein the previously deposited layer is partially cured.

Aspect 15. The method of any one of aspects 1 to 12, wherein depositing comprises depositing the coreactive composition adjoining a previously deposited layer, wherein the previously deposited layer is uncured.

Aspect 16. The method of any one of aspects 1 to 15, wherein depositing comprises depositing a sloped surface.

Aspect 17. The method of any one of aspects 1 to 16, wherein curing comprises allowing the deposited coreactive composition to cure at a temperature less than 30° C.

Aspect 18. The method of any one of aspects 1 to 17, wherein curing comprises heating the deposited coreactive composition to a temperature greater than 30° C.

Aspect 19. The method of any one of aspects 1 to 18, further comprising, after depositing, heating at least a portion of the sealing component.

Aspect 20. The method of any one of aspects 1 to 19, wherein the coreactive composition comprises a sulfur-containing prepolymer.

Aspect 21. The method of aspect 20, wherein the sulfur-containing prepolymer has a sulfur content from 10 wt % to 20 wt %, wherein wt % is based on the theoretical weight of the prepolymer.

Aspect 22. The method of any one of aspects 20 to 21, wherein the coreactive composition comprises from 40 wt % to 80 wt % of the sulfur-containing prepolymer.

Aspect 23. The method of any one of aspects 20 to 22, wherein the sulfur-containing prepolymer comprises a polythioether, a polysulfide, a sulfur-containing polyformal, a monosulfide, or a combination of any of the foregoing.

Aspect 24. The method of any one of aspects 1 to 23, wherein the coreactive composition comprises: a polyisocyanate and a polyamine; a polyisocyanate and a polyol; a polyfunctional Michael acceptor and a polyfunctional Michael donor; or a polythiol and a polyalkenyl, a polyalkynyl, a polyisocyanate, a polyepoxide, or a polyfunctional Michael acceptor.

Aspect 25. The method of any one of aspects 1 to 24, wherein the coreactive composition comprises from 10 wt % to 80 wt % filler, wherein wt % is based on the total weight of the coreactive composition.

Aspect 26. The method of any one of aspects 1 to 25, wherein, the coreactive composition comprises from 3 vol % to 70 vol % filler; and vol % is based on the total volume of the coreactive composition.

Aspect 27. The method of any one of aspects 1 to 26, wherein, the coreactive composition comprises from 0.05 wt % to 12 wt % of a low-density filler; the low-density filler comprises a specific gravity less than 1; and wt % is based on the total weight of the coreactive composition.

Aspect 28. The method of any one of aspects 1 to 27, wherein, the coreactive composition is actinic radiation-curable; and the method further comprises exposing the coreactive composition to actinic radiation.

Aspect 29. The method of any one of aspects 1 to 28, wherein the coreactive composition is not actinic radiation-curable.

Aspect 30. The method of any one of aspects 1 to 29, wherein during deposition the coreactive composition has an initially deposited viscosity of from 5E2 cP to 5E8 cP as determined using an Anton Paar rheometer with a 25 mm parallel plate geometry at 2 rpm and 25° C.

Aspect 31. The method of any one of aspects 1 to 30, further comprising, before depositing, combining and mixing a first component and a second component to form the coreactive composition.

Aspect 32. The method of aspect 31, wherein, the first component comprises a first reactive compound; the second component comprises a second reactive compound; and the first reactive compound is reactive with the second reactive compound.

Aspect 33. The method of aspect 32, wherein, the first component and/or the second component comprises a catalyst a cure accelerator, and/or a polymerization initiator.

Aspect 34. The method of aspect 31, wherein, the first component comprises a first reactive compound and a second reactive compound, wherein the first reactive compound is reactive with the second reactive compound in the presence of a catalyst, a cure accelerator, and/or polymerization initiator; and the second component comprises the catalyst, the cure accelerator, and/or the polymerization initiator.

Aspect 35. A chemically resistant sealing component fabricated using the method of any one of aspects 1 to 34.

Aspect 36. The sealing component of aspect 35, wherein, an average 2 Ra waviness of a surface of the sealing component is less than 10% the average waviness wavelength; the average 2 Ra waviness and the average waviness wavelength are determined using optical profilometry; and the top surface refers to the surface facing the nozzle during depositing.

Aspect 37. The sealing component of any one of aspects 35 to 36 wherein, the average 2 Ra waviness of the top surface of the sealing component is less than 1% the average waviness wavelength; the average 2 Ra waviness is determined using optical profilometry; and the top surface refers to the surface facing the nozzle during depositing.

Aspect 38. The sealing component of any one of aspects 35 to 37, wherein, the average 2 Ra waviness of the top surface of the sealing component is less than 200 μm; the average 2 Ra waviness is determined using optical profilometry; and the top surface refers to the surface facing the nozzle during depositing.

Aspect 39. The sealing component of any one of aspects 35 to 37, wherein, the average 2 Ra waviness of the top surface of the sealing component is less than 50 μm; the average 2 Ra waviness is determined using optical profilometry; and the top surface refers to the surface facing the nozzle during depositing.

Aspect 40. The sealing component of any one of aspects 35 to 39, wherein, the sealing component comprises a first surface and a second surface opposing the first surface; and the first surface and the second surface are parallel.

Aspect 41. The sealing component of any one of aspects 35 to 40, wherein, the sealing component comprises a first surface and a second surface opposing the first surface; at least a portion of the first surface and the second surface are non-parallel.

Aspect 42. The sealing component of any one of aspects 35 to 41, wherein a portion of the sealing component comprises a taper.

Aspect 43. The sealing component of any one of aspects 35 to 41, wherein a thickness of the sealing component is constant.

Aspect 44. The sealing component of any one of aspects 35 to 41, wherein a thickness of the sealing component is variable.

Aspect 45. The sealing component of any one of aspects 35 to 44, wherein a fracture energy of the fully cured sealing component is substantially the same as the fracture energy of an individual layer, wherein the fracture energy is determined according to ASTM D7313.

Aspect 46. The sealing component of any one of aspects 35 to 45, wherein the sealing component has isotropic physical properties within the nominal plane of the gasket.

Aspect 47. The sealing component of any one of aspects 35 to 46, wherein the sealing component has isotropic maximum tensile strength and % elongation at break within the nominal plane of the sealing component.

Aspect 48. The sealing component of any one of aspects 35 to 47, wherein the maximum tensile strength and % elongation to break are within +1-10% of a mean maximum tensile strength and % elongation to break, respectively, independent of the in-plane direction of the measurement.

Aspect 49. The sealing component of any one of aspects 35 to 48, wherein the sealing component has a specific gravity less than 1.3.

Aspect 50. The sealing component of any one of aspects 35 to 49, wherein the sealing component has a specific gravity less than 1.

Aspect 51. The sealing component of any one of aspects 35 to 50, wherein the sealing component exhibits less than 25 vol % swell following immersion in JRF Type III for 7 days at 70° C. as determined according to EN ISO 10563.

Aspect 52. The sealing component of any one of aspects 35 to 51, wherein the sealing component exhibits less than 10 vol % swell following immersion in a 3% NaCl aqueous solution for 7 days at 70° C. as determined according to EN ISO 10563.

Aspect 53. The sealing component of any one of aspects 35 to 52, wherein the sealing component exhibits a glass transition temperature Tg of less than −20C, determined by dynamic mechanical analysis (DMA) using a TA Instruments Q800 apparatus with a frequency of 1 Hz, an amplitude of 20 microns, and a temperature ramp of −80° C. to 160° C., with the $T_g$ identified as the peak of the tan δ curve.

EXAMPLES

Embodiments provided by the present disclosure are further illustrated by reference to the following examples, which describe sealing components and methods of making sealing components using three-dimensional printing. It will be apparent to those skilled in the art that many modifications, both to materials, and methods, may be practiced without departing from the scope of the disclosure.

Example 1

Three-Dimensionally Printed Sealing Components

PR 1440 B-2 fuel tank sealant was printed into 8×11×0.25-in$^3$ sheets using a custom-built three-dimensional printer consisting of a ViscoTec Duo dual extruder mounted to a Lulzbot Taz 6 gantry.

PR 1440 B has a viscosity of 10,000 poise (1,000 Pa-s), a maximum slump of 0.2 inches (5.1 mm) at 50 minutes, a tack free time of less than 8 hours at 25C/50% RH, a cure time to Shore 35A of 16 hours at 25C/50% RH as determined according to AMS-S-8802 Class B specification test methods.

PR-1440 B-2 is a two-part Class B manganese dioxide cured polysulfide aerospace sealant available from PPG Aerospace. The PR 1440 A and B packs containing either the manganese dioxide accelerant or the polysulfides were each loaded into 32 oz Nordson Optimum® cartridges and were each fed to the dual extruder using nitrogen pressure at approximately 80 psi to 100 psi.

Sheets were printed by extruding PR 1440 through a static mixing nozzle at a constant print head speed of 1,728 mm/min, a constant flow rate of 2.65 mL/min, and a B:A component volumetric flow ratio calibrated such that the extruded material consisted of 10:1 B:A by mass. Two sheets were printed. To print the first sheet, the nozzle was positioned 1.7 mm above the printed surface and for the second sheet the nozzle was positioned 0.3 mm lower than the initial surface of the deposited extrudate such that the nozzle tip skimmed and compressed the extrudates as the print head moved. The three-dimensionally printed sheets were cured at 23° C./50% RH for 7 days and the surface topography of the sheets was evaluated using a Keyence VR-3400 optical measurement system. The cured sealant sheets had a hardness of Shore 40A.

The surface topography of each sheet was evaluated in terms of the 2 Ra surface waviness where 2 Ra is two times the average feature dimension above and below a normalized surface. The 2 Ra surface waviness of the sheet printed with the nozzle 1.7 mm above the print surface was 10.1 microns (FIGS. 4A-4D), and the 2 Ra surface waviness for the sheet in which the nozzle was positioned to skim the surface of the layer being deposited was 2.7 microns (FIGS. 4A-4D).

Figure 3A:
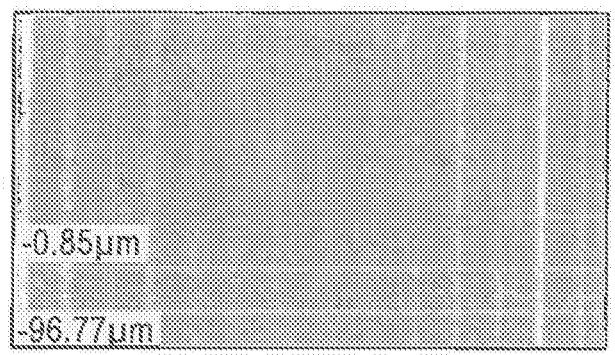
FIGS. 3A-3D show surface waviness profiles for a three-dimensional printed sealing component in which the nozzle was positioned 1.7 mm above the surface of the extruded material.
Figure 3B:
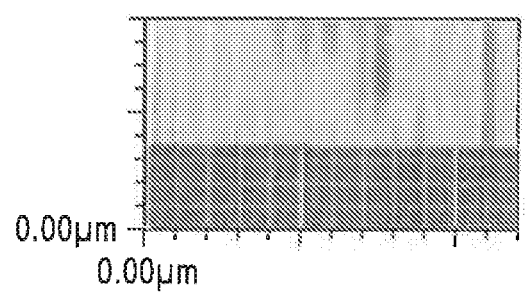
Figure 3C:
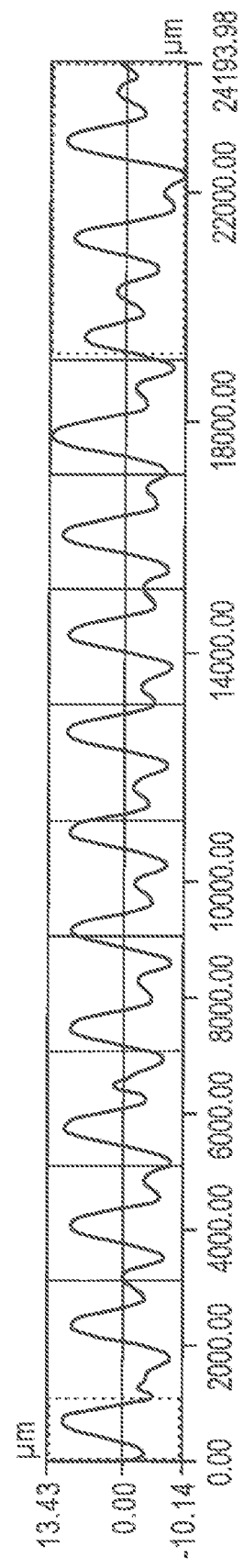
Figure 3D:
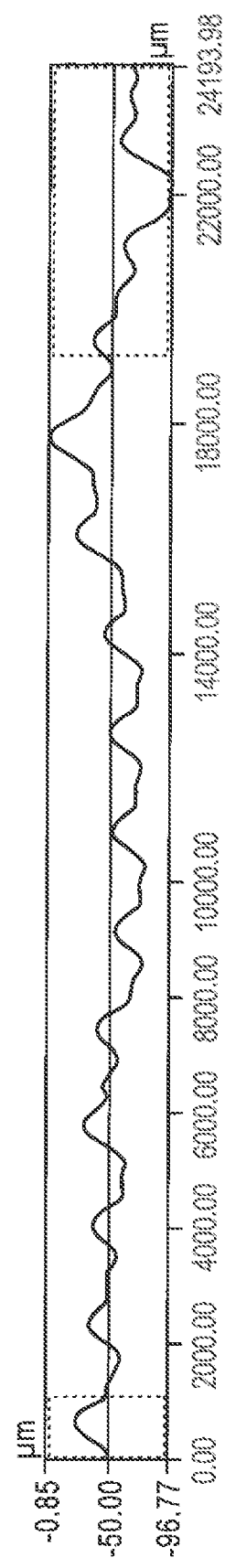
Figure 4A:
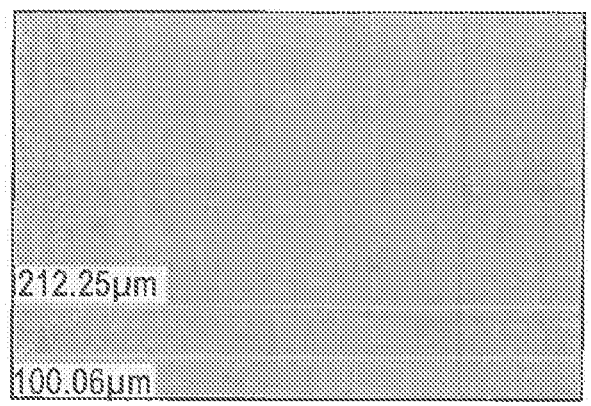
FIGS. 4A-4D show surface waviness profiles for a three-dimensional printed sealing component in which the nozzle was positioned at the surface of the extruded material.
Figure 4B:
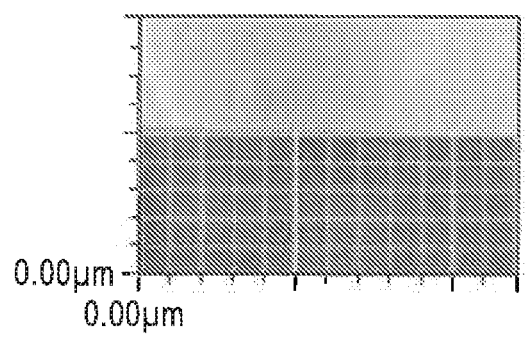
Figure 4C:
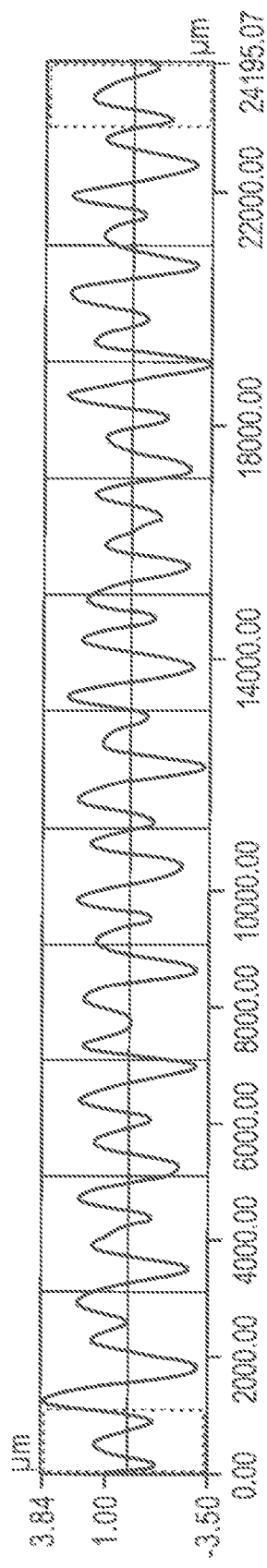
Figure 4D:
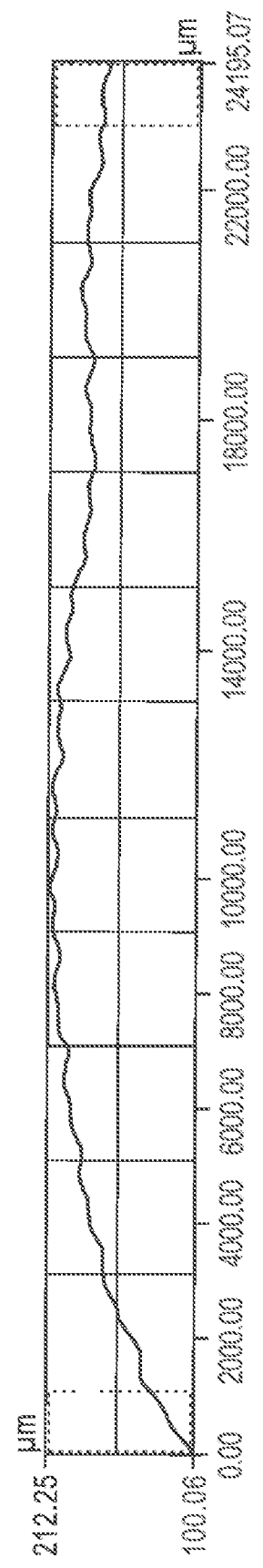

FIGS. 3A-3D and 4A-4D show profiles of surfaces of sealing components made using three-dimensional printing. FIGS. 3A and 4A show an optical image of the printed surfaces. FIGS. 3B and 4B show heat maps of the respective surfaces. FIGS. 3C and 4C show surface waviness profiles with respect to the normalized surface across the portion of the surface indicated by the solid line in FIGS. 3A and 4A, respectively. The 2 Ra surface waviness profiles were measure with respect to a normalized surface where long range bowing or distortion was accounted for by normalizing to a planar surface. FIGS. 3D and 4D show the total surface profile that includes both the surface waviness and the longer-range features. The total surface profile is superimposed on the optical image in FIGS. 3A and 4B, respectively.

By three-dimensional printing a coreactive composition having a gel time of greater than 1 hour, a tack free time of less than 8 hours at 25C/50% RH, and a cure time of 16 hours at 25C/50% RH (hardness of Shore 35A), the 2 Ra surface waviness was reduced when the print nozzle was dragged through the deposited material during printing. For example, comparing the first and second sheets, bringing the nozzle into contact with the printed material resulted in a 3.74-fold reduction in 2 Ra surface waviness.

As shown by the optical images presented in FIGS. 3A-3D and 4A-4D, bringing the nozzle into contact with the printed material resulted in a visually smoother 3D printed surface. The peak-to-peak distance (i.e. the wavelength of the print lines) was defined as an average of the measurements between five peaks in each profile and was used to compare the width of print lines in the print profiles shown in FIGS. 3A-3D and FIGS. 4A-4D. When the nozzle was positioned 1.7 mm above the print surface (FIGS. 3A-3D), the average peak-to-peak distance was 1.715 mm, and when the nozzle was positioned 0.3 mm into the deposited surface (FIGS. 4A-4D), the peak-to-peak distance was 0.909 mm. Thus, the 2 Ra surface waviness was 0.5% of the print line wavelength when the nozzle was positioned 1.7 mm above the print surface and was reduced to 0.3% of the print line wavelength when the nozzle was positioned to so as to skim the print surface during printing.

Thus, by adjusting the height of the nozzle above the print surface, the amplitude of the print lines can be small with respect to the dimensions of the deposited extrudate.

Example 2

Mechanical Properties of a Three-Dimensionally Printed Sealing Component

Two rectangular sealing components with dimensions of 20.32 cm by 27.94 cm were printed using a custom-built 3D printer consisting of a ViscoTec Duo dual extruder mounted to a Lulzbot Taz 6 gantry. The A and B packs of PR-1440 B-2 fuel tank sealant were loaded into separate 32-oz Nordson Optimum® cartridges and were each fed into the dual extruder using nitrogen pressure at 80 psi to 100 psi.

Figure 5:
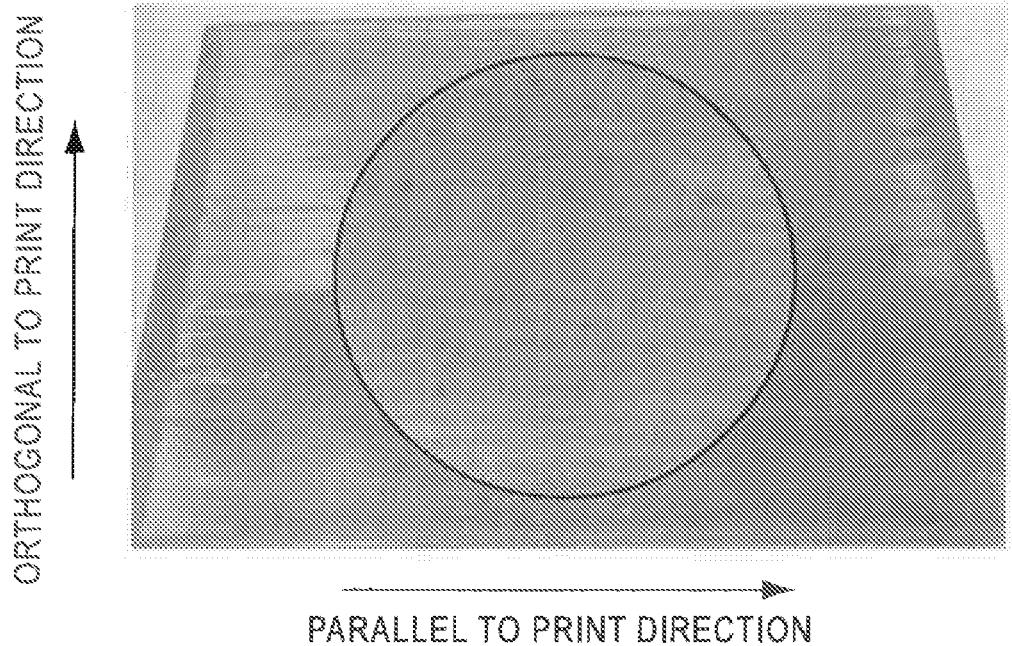
FIG. 5 shows photographs of the top surface of a three-dimensionally printed sealing component used for tensile testing.

Sealing component 1 was printed as a single layer having a thickness of 1.90 mm and sealing component 2 was 3D printed as four (4) successive overlying layers to produce a total thickness of 6.45 mm (Table 1). The sealing components were 3D printed with the infill pattern of every layer being an identical rectilinear pattern with the longest print lines all in the direction of the longest dimension (27.94 cm) of the rectangular geometry (FIG. 5). The average wavelength of the print lines (average peak-to-peak distance between the print lines) for both sealing components was approximately 0.99 mm as measured by optical profilometry.

The setup and parameters used for 3D printing the sealing components was as follows. PR 1440 A and B packs were each loaded into separate 32-oz Nordson Optimum® cartridges and were independently pumped in the dual extruder using nitrogen pressure at approximately 80 psi to 100 psi. Sheets were printed by extruding PR 1440 through a MCH-05-24T static mixing nozzle (using a custom fitting to attach the nozzle to the ViscoTec Duo extruder head) at a constant print head speed of 1,728 mm/min, a constant flow rate of 2.65 mL/min and a B:A component volumetric flow ratio calibrated such that the extruded material consisted of a 10:1 B:A by mass. Each sealing component was cured for 7 days at 25° C./50% RH.

Figure 6:
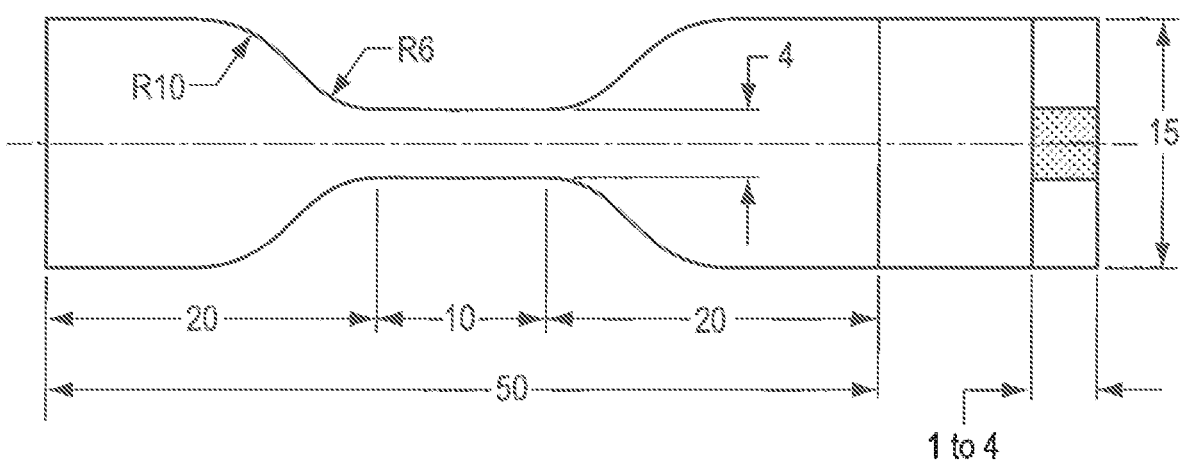
FIG. 6 shows the dimensions of the test specimen used for tensile testing.

Dogbones with dimensions shown in FIG. 6 were cut out of the rectangular sealing components using a custom cutting die and a Carver press. For each sample, five (5) dogbone specimens were cut out in the direction parallel to the print lines and five (5) dogbone specimens were cut in the direction orthogonal to the print lines (see FIG. 5). Dogbones were tested on a Model 3345 Instron at a pull rate of 50 mm/min.

TABLE 1

Average tensile strength and elongation at break measured for dogbone specimens pulled along the print direction or orthogonal to print direction.

| Sealing component | Number of Layers | Thickness (mm) | Pull direction parallel to print lines | | Pull direction orthogonal to print lines | | Tensile Strength Orthogonal vs |
|---|---|---|---|---|---|---|---|
| | | | Ultimate Tensile Strength (MPa) | Elongation at Break % | Ultimate Tensile Strength (MPa) | Elongation at Break % | Tensile Strength Parallel |
| 1 | 1 | 1.90 | 4.60 | 574 | 4.58 | 462 | 100% |
| 2 | 4 | 6.45 | 4.45 | 454 | 4.09 | 423 | 92% |

The mechanical properties of the sealing components are similar regardless of the pulling direction. The sealing components printed with the two different types of nozzles exhibit similar tensile properties in the parallel and in the orthogonal directions. Thus, the mechanical properties of the three-dimensionally printed sealing components are isotropic in the plane of the sealing component.

Finally, it should be noted that there are alternative ways of implementing the embodiments disclosed herein. Accordingly, the present embodiments are to be considered as illustrative and not restrictive. Furthermore, the claims are not to be limited to the details given herein and are entitled to their full scope and equivalents thereof.

What is claimed is:

1. A method of making a chemically resistant sealing component, comprising:
   depositing successive layers of a coreactive composition comprising a sulfur-containing prepolymer to form the chemically resistant sealing component, wherein the successive layers of the coreactive composition are deposited in a predetermined shape using three-dimensional printing by extruding the coreactive composition through a nozzle onto a substrate; and
   curing the deposited coreactive composition to provide the chemically resistant sealing component;
   wherein the chemically resistant sealing component exhibits a glass transition temperature $T_g$ of less than −20° C., determined by dynamic mechanical analysis (DMA) using a dynamic mechanical analyzer with a frequency of 1 Hz, an amplitude of 20 microns, and a temperature ramp of −80° C. to 160° C., with the $T_g$ identified as a peak of the tan δ curve; and
   wherein at least one of the deposited successive layers is deposited adjoining one or more previously deposited layers and wherein the depositing of successive layers of the coreactive composition and the curing of the deposited coreactive composition causes adjoining layers of the successively deposited layers to at least one of chemically bond and physically bond.

2. The method of claim 1, wherein,
   wherein the nozzle comprises a tip;
   a deposited layer is characterized by a first layer thickness when the distance between the substrate and the nozzle tip is greater than the first layer thickness;
   depositing further comprises positioning the nozzle tip at a distance from the substrate that is less than the first layer thickness and extruding the coreactive composition through the nozzle; and
   positioning the nozzle at a distance from the substrate that is less than the first layer thickness and extruding the coreactive composition through the nozzle forms a deposited layer having a second layer thickness, wherein the second layer thickness is less than the first layer thickness.

3. The method of claim 2, wherein the nozzle tip further comprises a component configured to smooth a deposited layer.

4. The method of claim 3, wherein the component is configured to reduce the average 2 Ra waviness of a surface of the chemically resistant sealing component to less than 10% the average waviness wavelength, as determined using optical profilometry;
   wherein the surface of the chemically resistant sealing component refers to a surface facing the nozzle during depositing.

5. The method of claim 4, wherein the average 2 Ra waviness of surface of the chemically resistant sealing component is less than 200 μm.

6. The method of claim 1, wherein during the deposition the coreactive composition has a temperature less than 50° C.

7. The method of claim 1, wherein the curing comprises allowing the deposited coreactive composition to cure at a temperature less than 30° C.

8. The method of claim 1, wherein the coreactive composition comprises from 10 wt % to 80 wt % filler, wherein wt % is based on the total weight of the coreactive composition.

9. The method of claim 1, wherein,
   the coreactive composition comprises from 3 vol % to 70 vol % filler; and vol % is based on the total volume of the coreactive composition.

10. The method of claim 1, wherein the coreactive composition has a specific gravity less than 1.3.

11. The method of claim 1, wherein the chemically resistant sealing component exhibits less than 25 vol % swell following immersion in the chemical for 7 days at 70° C.

12. The method of claim 1, wherein the chemically resistant sealing component exhibits less than 10 vol % swell following immersion in a 3% NaCl aqueous solution for 7 days at 70° C.

13. The method of claim 1, wherein a fracture energy of the chemically resistant sealing component is substantially the same as a fracture energy of an individually deposited layer of coreactive composition.

14. The method of claim 1, wherein the chemically resistant sealing component is an aerospace sealing component configured to seal adjoining surfaces on an aerospace vehicle.

* * * * *